United States Patent
Nakada

(10) Patent No.: US 11,030,799 B2
(45) Date of Patent: Jun. 8, 2021

(54) IMAGE PROCESSING APPARATUS, IMAGE PROCESSING METHOD AND STORAGE MEDIUM. WITH ESTIMATION OF PARAMETER OF REAL ILLUMINATION BASED ON NORMAL INFORMATION ON PIXEL INCLUDED IN HIGH LUMINANCE AREA

(71) Applicant: CANON KABUSHIKI KAISHA, Tokyo (JP)

(72) Inventor: Yuichi Nakada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/582,554

(22) Filed: Sep. 25, 2019

(65) Prior Publication Data

US 2020/0020152 A1    Jan. 16, 2020

Related U.S. Application Data

(63) Continuation of application No. PCT/JP2018/011339, filed on Mar. 22, 2018.

(30) Foreign Application Priority Data

Mar. 27, 2017  (JP) .............................. JP2017-061359
Jan. 30, 2018  (JP) .............................. JP2018-014019

(51) Int. Cl.
*G06T 15/50*    (2011.01)
*G06T 15/80*    (2011.01)
(Continued)

(52) U.S. Cl.
CPC ........ *G06T 15/506* (2013.01); *G06K 9/00255* (2013.01); *G06T 5/002* (2013.01);
(Continued)

(58) Field of Classification Search
CPC .................................................... G06T 15/506
(Continued)

(56) References Cited

U.S. PATENT DOCUMENTS 7,539,342 B2    5/2009  Tabata et al.
9,055,218 B2    6/2015  Nishiyama et al.
(Continued)

FOREIGN PATENT DOCUMENTS

JP    2005-327009 A    11/2005
JP    2013-235537 A    11/2013
JP    2016-208098 A    12/2016

OTHER PUBLICATIONS

Ikeda et al., "Relighting with Dynamic Light Environments Using an RGB-D Camera" IEICE Technical Report, Jan. 16, 2014, vol. 113, No. 403. pp. 219-224 (2014).
(Continued)

*Primary Examiner* — Shivang I Patel
(74) *Attorney, Agent, or Firm* — Venable LLP

(57) ABSTRACT

A natural image with a three-dimensional effect is generated after correcting a high-luminance area of an image. The image processing apparatus of the present invention includes a first acquisition unit configured to acquire normal information corresponding to an image, an estimation unit configured to estimate a real illumination parameter based on a high-luminance area of an object included in the image, a first setting unit configured to set a virtual illumination parameter based on the real illumination parameter, and a lighting processing unit configured to perform lighting processing for the image based on the normal information and the virtual illumination parameter.

15 Claims, 21 Drawing Sheets

(51) Int. Cl.
    *G06K 9/00*     (2006.01)
    *G06T 5/00*     (2006.01)

(52) U.S. Cl.
    CPC .... *G06T 15/80* (2013.01); *G06T 2207/10024* (2013.01); *G06T 2207/10028* (2013.01)

(58) Field of Classification Search
    USPC .......................................................... 345/426
    See application file for complete search history.

(56) References Cited

U.S. PATENT DOCUMENTS

| | | |
|---|---|---|
| 9,438,792 B2 | 9/2016 | Nakada et al. |
| 10,303,973 B2 | 5/2019 | Nakada et al. |
| 2005/0271295 A1 | 12/2005 | Tabata et al. |
| 2017/0011496 A1* | 1/2017 | Lu .............................. G06T 7/40 |
| 2017/0244882 A1* | 8/2017 | Kitajima ................... G06K 9/52 |
| 2019/0236404 A1 | 8/2019 | Nakada et al. |
| 2020/0020152 A1 | 1/2020 | Nakada |

OTHER PUBLICATIONS

International Search Report dated Jun. 6, 2018, in corresponding International Patent Application No. PCT/JP2018/011339.

\* cited by examiner $I(i,j) = (I_r(i,j), I_g(i,j), I_b(i,j))$ $D(i,j)$

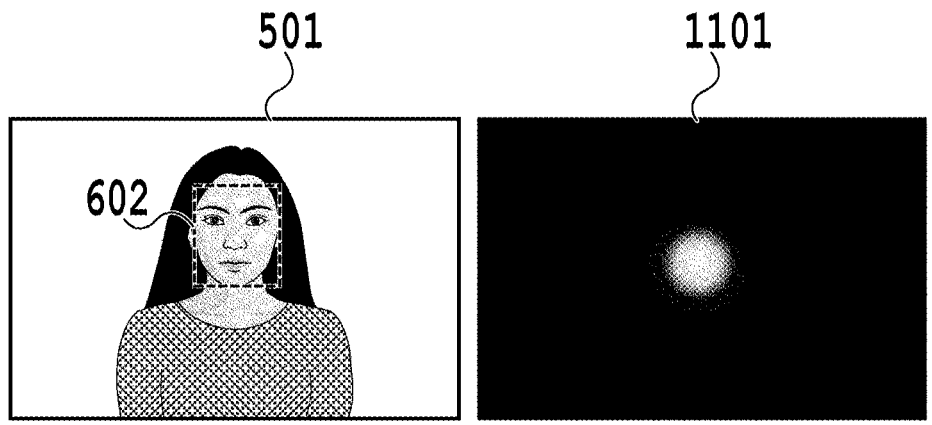
FIG.11A   FIG.11B
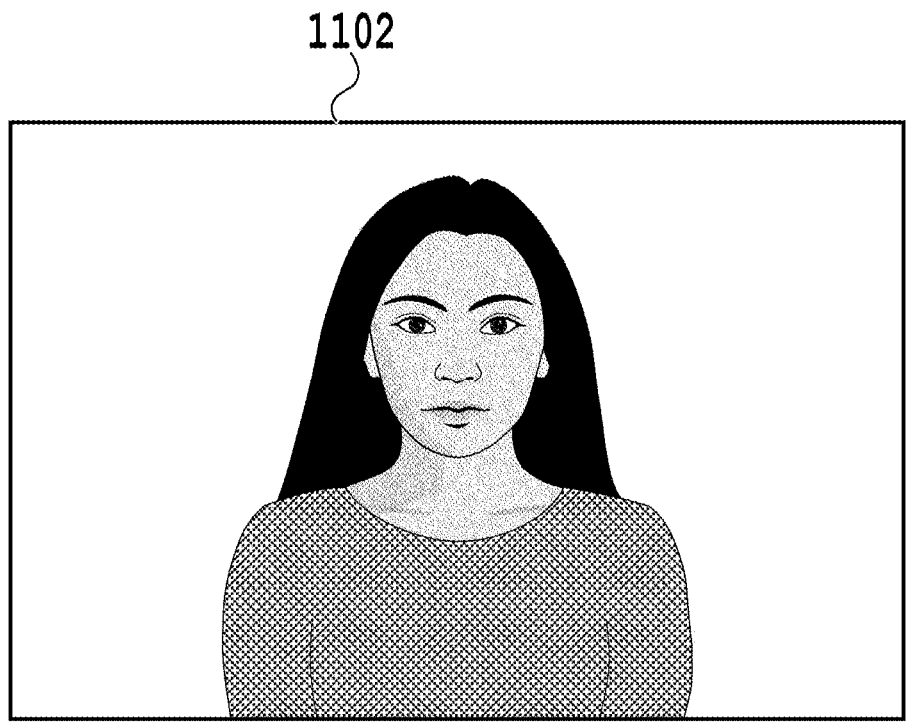
FIG.11C

IMAGE PROCESSING APPARATUS, IMAGE PROCESSING METHOD AND STORAGE MEDIUM. WITH ESTIMATION OF PARAMETER OF REAL ILLUMINATION BASED ON NORMAL INFORMATION ON PIXEL INCLUDED IN HIGH LUMINANCE AREA

CROSS-REFERENCE TO RELATED APPLICATIONS

This application is a Continuation of International Patent Application No. PCT/JP2018/011339, filed Mar. 22, 2018, which claims the benefit of Japanese Patent Applications No. 2017-061359 filed Mar. 27, 2017 and 2018-014019 filed Jan. 30, 2018, all of which are hereby incorporated by reference herein in their entirety.

BACKGROUND OF THE INVENTION

Field of the Invention

The present invention relates to an image processing apparatus that corrects a high-luminance area of an image and gives a desired gloss, an image processing method, and a storage medium.

Background Art

In a case where a photo or video image is captured outdoors, depending on the position relationship between the sunlight and an object, light reflects strongly from a face or the like of the object and as a result, a shine (that is, a state where the skin seems shiny) occurs. Further, also in a case where image capturing is performed indoors by using an illuminating device, such as an electronic flash, unless the intensity and an orientation of illumination light are adjusted appropriately, the shine also occurs, and as a result of this, the captured image will be an unfavorable photo.

As a method of correcting such a captured image, for example, an image correction device of PTL 1 is known. In the image correction device of PTL 1, by calculating the shine intensity based on the intensity of the skin color and the high luminance intensity, the image is corrected so that the higher the shine intensity, the lower the luminance becomes. However, by the processing to reduce the luminance value in accordance with the shine intensity as described in PTL 1, the variation of the luminance value in the face area of the object becomes small because the shine is suppressed and as a result, the corrected image will give an impression of flatness. That is, the three-dimensional effect is lost in the corrected image.

Consequently, an image creating apparatus has been disclosed that produces a three-dimensional effect by, for example, giving a shade to an image that lacks a three-dimensional effect (that is, an image from which a three-dimensional effect is lost) (PTL 2). In the image creating apparatus of PTL 2, a three-dimensional effect is produced by generating a virtual illumination estimated based on the specified area and shade information from three-dimensional information corresponding to a captured image and blending them with the captured image.

CITATION LIST

Patent Literature

PTL 1 Japanese Patent Laid-Open No. 2005-327009
PTL 2 Japanese Patent Laid-Open No. 2013-235537

However, the image creating apparatus of PTL 2 does not take into consideration the orientation of the real illumination in a case where the virtual illumination is set. Because of this, in a case where the orientation of the virtual illumination and the orientation of the real illumination are largely different, the gloss and shade are attached to a position largely different from the position in a case where the position is illuminated by the real illumination, and therefore, there is a possibility that an unnatural image is created.

The present invention has been made in view of the conventional problem and an object thereof is to generate a natural image with a three-dimensional effect by correcting a high-luminance area of the image.

SUMMARY OF THE INVENTION

In order to achieve the above-described object, the image processing apparatus of the present invention includes: a first acquisition unit configured to acquire normal information corresponding to an image; an estimation unit configured to estimate a real illumination parameter based on a high-luminance area of an object included in the image; a first setting unit configured to set a virtual illumination parameter based on the real illumination parameter; and a lighting processing unit configured to perform lighting processing for the image based on the normal information and the real illumination parameter.

Further features of the present invention will become apparent from the following description of exemplary embodiments with reference to the attached drawings.

BRIEF DESCRIPTION OF THE DRAWINGS

FIG. 11A is a diagram showing an outline of high-luminance area correction processing;

FIG. 11B is a diagram showing an outline of high-luminance area correction processing;

FIG. 11C is a diagram showing an outline of high-luminance area correction processing;

DESCRIPTION OF THE EMBODIMENTS

First Embodiment (Outer Appearance of Image Capturing Apparatus)

Figure 1A:
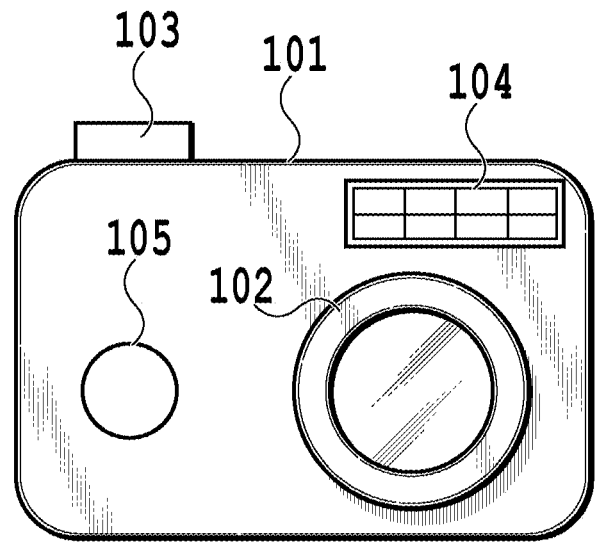
FIG. 1A is a diagram showing an outer appearance of a front side of an image capturing apparatus including an image processing apparatus according to a first embodiment.
Figure 1B:
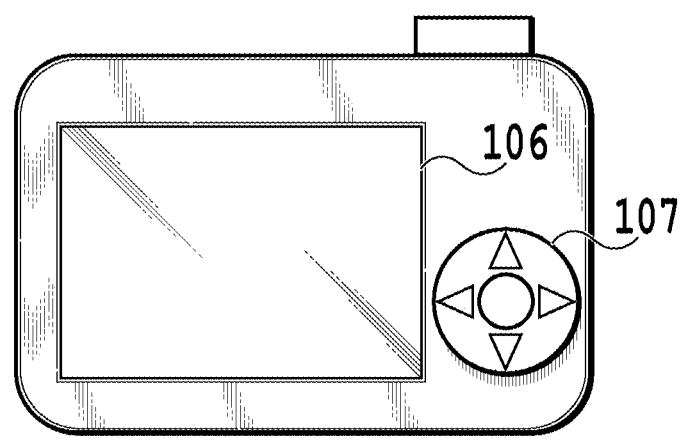
FIG. 1B is a diagram showing an outer appearance of a rear side of the image capturing apparatus including the image processing apparatus according to the first embodiment.

FIG. 1A and FIG. 1B are each a diagram showing an outer appearance of an image capturing apparatus including an image processing apparatus according to an embodiment and FIG. 1A shows the outer appearance of the front side of the image capturing apparatus and FIG. 1B shows the outer appearance of the rear side of the image capturing apparatus, respectively. An image capturing apparatus 101 includes an optical unit 102, an image capturing button 103, an electronic flash 104, a distance image acquisition unit 105, a display unit 106, and an operation button 107.

The optical unit 102 is a lens barrel including a zoom lens, a focus lens, a shaking correction lens, an aperture, and a shutter and gathers light information on an object. The image capturing button 103 is a button for a user to instruct the image capturing apparatus 101 to start image capturing. The electronic flash 104 is an illuminator capable of emitting light at the same time as the start of image capturing in accordance with instructions of a user. The distance image acquisition unit 105 acquires distance image data of an object in response to image capturing instructions. Here, the distance image data means image data storing an object distance corresponding to each pixel as the pixel value of the pixel of an image.

The distance image acquisition unit 105 includes an infrared light emitting unit configured to emit infrared light and a light receiving unit configured to receive infrared light reflected from an object and calculates a distance value from the image capturing apparatus to the object based on the time from the emission of infrared light until the reception of the infrared light after reflection from the object. Then, the distance image acquisition unit 105 calculates position information on the object based on the calculated distance value and distance image capturing information including the number of sensor pixels of the light receiving unit, the angle of view, and the like, and generates distance image data. The acquisition method of distance image data is not necessarily limited to this. Consequently, for example, it is also possible to acquire distance image data by providing an optical system similar to the optical unit 102 in place of the distance image acquisition unit 105 and performing triangulation based on the disparity between pieces of image data captured from two different viewpoints.

The display unit 106 is a display device, such as a liquid crystal display, which displays image data processed in the image capturing apparatus 101 and various other kinds of data. As shown in FIG. 1B, the image capturing apparatus 101 does not include an optical finder, and therefore, the framing operation (check of focus and composition) is performed by using the display unit 106. That is, for the image capturing apparatus 101, image capturing is performed while checking the live-view image in the display unit 106, and therefore, the display unit 106 also functions as an electronic finder in a case where the operation of framing or focusing is performed. In addition, the display unit 106 also displays a camera setting menu, and the like.

The operation button 107 is a button for a user to instruct the image capturing apparatus 101 to perform a switch operation of the operation mode of the image capturing apparatus 101 and specify various parameters and the like at the time of image capturing. The image capturing apparatus 101 includes a lighting correction processing mode to correct the way the captured image is illuminated after image capturing as one of the operation modes. Because of this, it is possible for a user to switch the mode to the lighting correction processing mode, set an illumination parameter of a virtual illumination used for lighting correction, and further select an object for which the way the object is illuminated is adjusted (corrected), and so on by using the operation button 107 or the image capturing button 103. Further, it is also possible for a user to specify whether or not to output distance image data in a case where the user outputs corrected image data. In addition, the display unit 106 may include a touch screen function and in such a case, it is also possible to handle instructions of a user using a touch screen as an input to the operation button 107.

(Internal Configuration of Image Capturing Apparatus)

Figure 2:
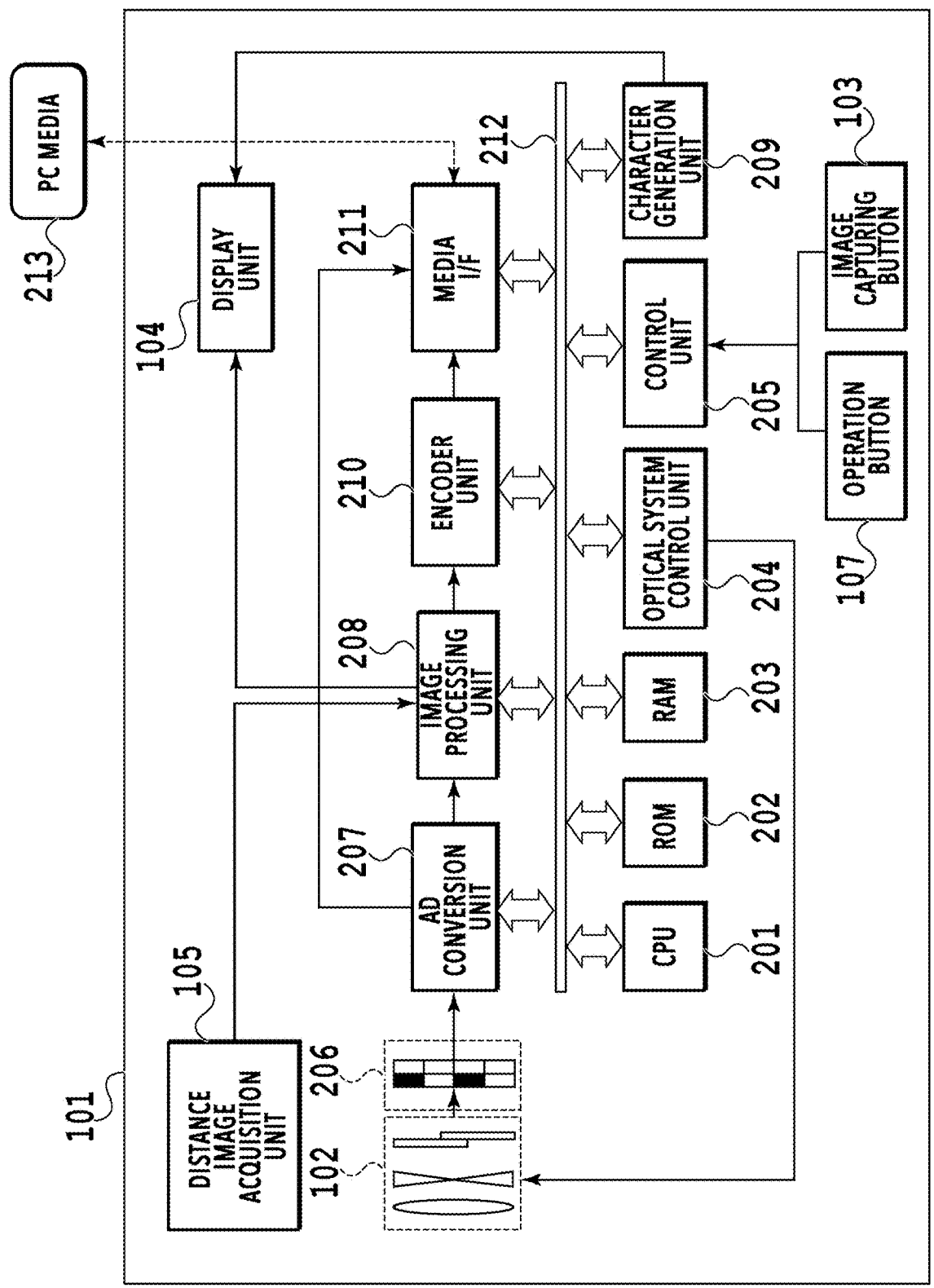
FIG. 2 is a block diagram showing an internal configuration of the image capturing apparatus including the image processing apparatus according to the first embodiment.

FIG. 2 is a block diagram showing the internal configuration of the image capturing apparatus including the image processing apparatus according to the embodiment. A CPU 201 relates to the whole of the processing of each component and sequentially reads and interprets commands stored in a ROM (Read Only Memory) and a RAM (Random Access Memory) 203 and performs processing in accordance with the interpretation results.

The ROM 202 stores programs executed by the CPU 201. In the present embodiment, it is assumed that the ROM 202 stores face normal information. The face normal information includes normal image data storing a normal vector on the face surface, which corresponds to the face in a predetermined shape, in the pixel value and organ position information indicating the organ positions of the eye, nose, mouth, and the like in the normal image data. The RAM 203 stores programs executed by the CPU 201.

An optical system control unit 204 is a control circuit that performs control specified by the CPU 201 for the optical unit 102, such as focusing, shutter opening, and aperture adjustment. A control unit 205 is a control circuit that receives user instructions from the image capturing button 103 and the operation button 107 and performs control of, such as image capturing, switching to the lighting correction processing mode, selection of an object area, and setting of an illumination parameter. A color image capturing element unit 206 is an image capturing element that converts light information gathered by the optical unit 102 into a current value. The color image capturing element unit 206 includes a color filter having a predetermined array, such as a Bayer array, and acquires color information on an object from the light gathered by the optical unit 102.

An A/D conversion unit 207 is a processing circuit that converts color information on an object detected by the color image capturing element unit 206 into a digital signal value to generate RAW image data. In the present embodiment, it is assumed that it is possible to acquire distance image data and RAW image data captured at the same time. An image processing unit 208 performs development processing for the RAW image data acquired by the A/D conversion unit 207 and generates color image data. Further, the image processing unit 208 performs various kinds of image processing, such as processing to generate corrected image data obtained by performing lighting correction for the color image data by using the color image data and the distance image data. The internal configuration and function of the image processing unit 208 will be described later in detail by using FIG. 3, to be described later.

A character generation unit 209 is a processing circuit that generates characters, graphics, and the like. The characters and graphics generated by the character generation unit 209 are displayed on the display unit 106 by being superimposed on image data, corrected image data, and the like. An encoder unit 210 converts various kinds of image data, such as the color image data generated in the image processing unit 208 and the corrected image data, into a file format, such as Jpeg. A media I/F 211 is an interface for transmitting and receiving image data to and from PC/media 213 (for example, hard disk, memory card, CF card, SD card, and the like). As the media I/F 211, for example, USB (Universal Serial Bus) or the like is used. A system bus 212 is a bus for transmitting and receiving data.

(Internal Configuration of Image Processing Unit)

Figure 3:
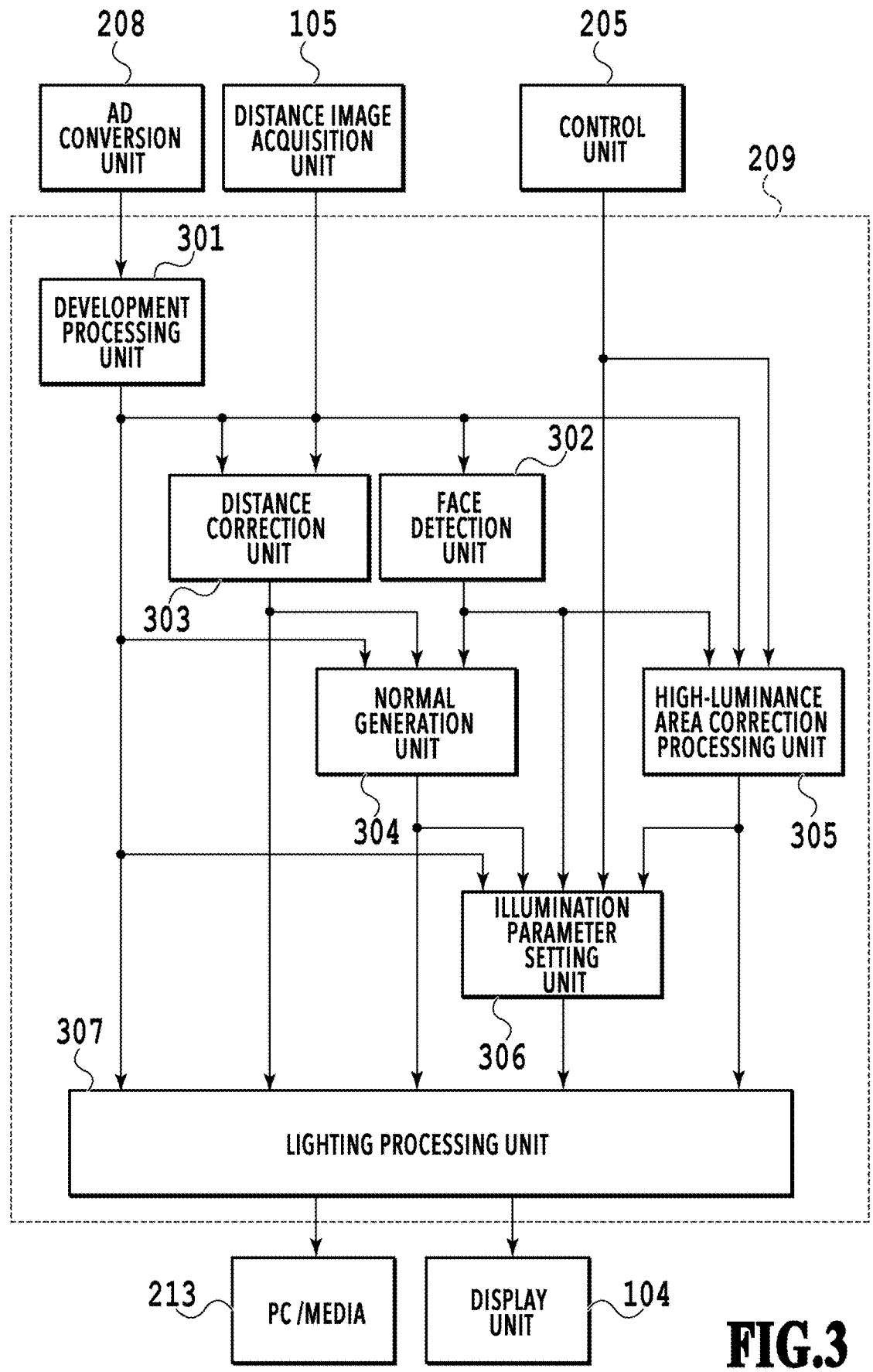
FIG. 3 is a block diagram showing a function configuration of the image processing apparatus according to the first embodiment.

FIG. 3 is a block diagram showing the function configuration of the image processing apparatus (image processing unit 208) in the embodiment. A development processing unit 301 performs white balance processing, demosaicking processing, noise reduction processing, color conversion processing, edge enhancement processing, gamma processing, and the like for the RAW image data acquired from the A/D conversion unit 207 and generates color image data. It is possible for the image capturing apparatus 101 to output and display the color image data generated in the development processing unit 301 on the display unit 106 and store the color image data in the storage device, such as the RAM 203 and the PC/media 213. Further, in the present embodiment, the development processing unit 301 generates color image data without performing gamma processing and outputs the generated color image data to a lighting processing unit 307.

A face detection unit 302 acquires face information on an object from the color image data acquired from the development processing unit 301. In the face information on an object, at least information relating to a face area indicating the area occupied by the face of an object in the color image data and organ positions indicating positions of the eye, the mouth, and the like included in the face in the color image data is included. A distance correction unit 303 generates corrected distance image data by correcting distance image data based on color image data. Specifically, the distance correction unit 303 corrects a defect of a distance value, a discrepancy in the outline portion, and the like in the distance image data.

A normal generation unit 304 generates object normal image data based on the corrected distance image data generated in the distance correction unit 303. Further, the normal generation unit 304 generates face normal image data by correcting the face normal information stored in the ROM 202 based on the face information acquired from the face detection unit 302 and the color image data acquired form the development processing unit 301. After generating the object normal image data and the face normal image data, the normal generation unit 304 generates integrated normal image data by further integrating (composing) those images.

A high-luminance area correction processing unit 305 generates high-luminance area corrected image data by suppressing the luminance value in the high-luminance area of the face area of an object specified based on the face information acquired from the face detection unit 302 in the color image data acquired from the development processing unit 301. Further, the high-luminance area correction processing unit 305 sets a high-luminance area correction parameter and determines the intensity of high-luminance area correction processing based on the user operation acquired from the control unit 205 in generation of the high-luminance area corrected image data.

An illumination parameter setting unit 306 sets an illumination parameter based on the high-luminance area of an object in the color image data and the integrated normal image data. Specifically, the illumination parameter setting unit 306 extracts the high-luminance area of an object by performing threshold-based processing, as will be described later, and the like. Then, the illumination parameter setting unit 306 sets an illumination parameter to be used in the lighting processing in the post process based on the real illumination position at the time of image capturing, which is estimated from the normal vector of the extracted high-luminance area of an object. At the time of estimating the real illumination position, it is also possible to weight the normal vector based on the face information.

The lighting processing unit 307 performs lighting processing for the high-luminance area corrected image data based on the corrected distance image data, the integrated normal image data, and the illumination parameter and gives a highlight to the object. Then, by giving a highlight to the object as described above, an image with a three-dimensional effect is generated. It is possible for the image capturing apparatus 101 to output the corrected image data generated by the lighting processing to the storage device, such as the RAM 203 and the PC/media 213, and store it therein, and output the corrected image data to the display unit 106 and display it thereon. Further, it may also be possible to perform color processing, such as gamma processing, before outputting the corrected image data.

(Processing Flow of Image Processing Unit)

Figure 4:
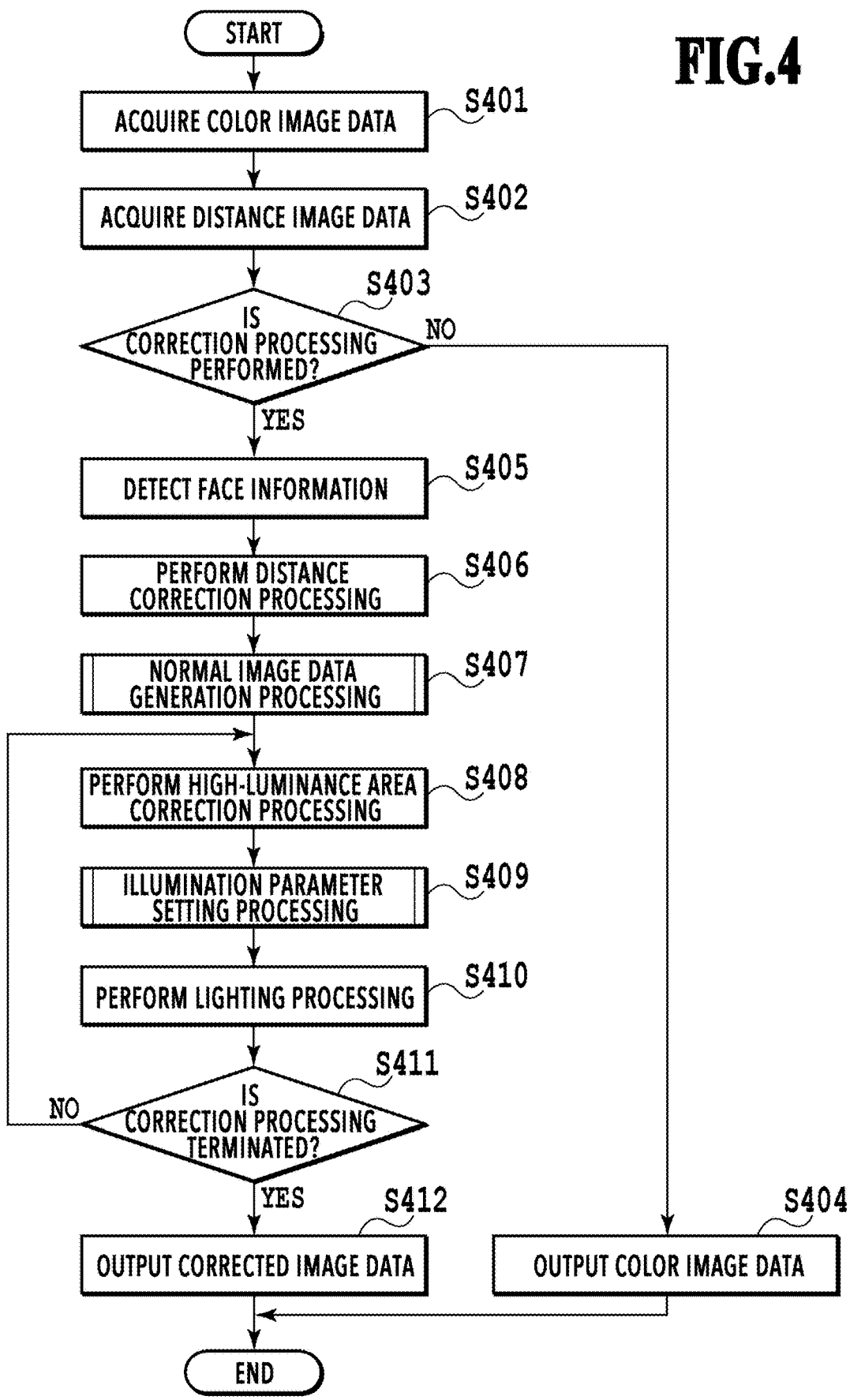
FIG. 4 is a flowchart showing a procedure of processing in the image processing apparatus according to the first embodiment.

FIG. 4 is a flowchart showing a procedure of processing in the image processing apparatus (image processing unit 208) according to the embodiment. In the processing shown in FIG. 4, first, the image processing unit 208 generates integrated normal image data corresponding to the color image data. Next, the image processing unit 208 generates high-luminance area corrected image data by performing processing to suppress the luminance for the high-luminance area of the face area of an object specified based on the face information. Further, the image processing unit 208 sets an illumination parameter based on the real illumination position at the time of image capturing, which is estimated from the normal information on the high-luminance area of the object. Then, the image processing unit 208 generates corrected image data, which is obtained by giving a highlight to the high-luminance area corrected image data, based on the integrated normal image data and the illumination parameter.

Figure 5A:
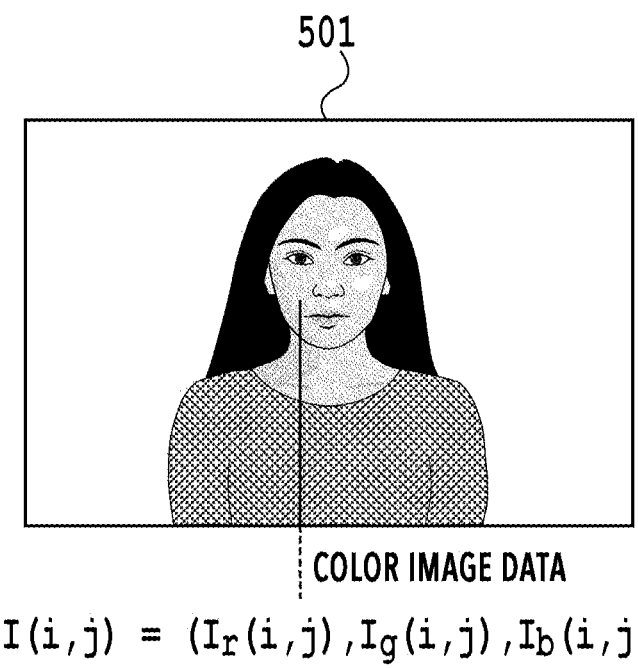
FIG. 5A is a diagram showing color image data.

In the following, the processing procedure of the image processing unit 208 is described in detail. The development processing unit 301 generates color image data based on RAW image data acquired from the A/D conversion unit 207 (S401). The color image data is, for example, shown as in FIG. 5A and in a pixel I (i, j) of color image data 501, RGB values are stored as pixel values and each is indicated as Ir (i, j), Ig (i, j), and Ib (i, j). The acquisition method of color image data is not necessarily limited to this. Consequently, for example, it is also possible to generate color image data by acquiring the RAW image data stored in the RAM 203 or the PC/media 213 and from the acquired RAW image data by the development processing unit 301. Further, it is also possible to directly acquire the color image data stored in the RAM 203 or the PC/media 213.

Figure 5B:
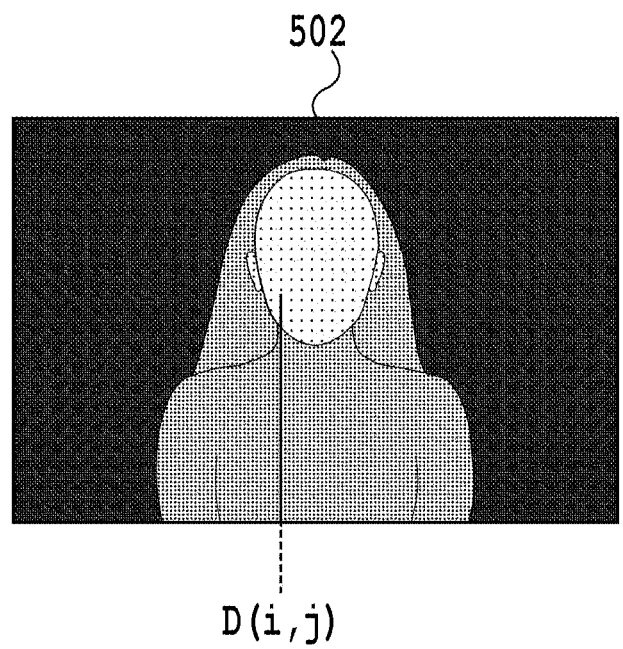
FIG. 5B is a diagram showing distance image data.

The distance correction unit 303 acquires the distance image data from the distance image acquisition unit 105 (S402). The distance image data is, for example, shown as in FIG. 5B and in a pixel D (i, j) of the distance image data 502, a distance value from the image capturing apparatus to the object is stored. The acquisition method of distance image data is not necessarily limited to this. Consequently, for example, it is also possible to directly acquire the distance image data stored in the RAM 203 or the PC/media 213.

The image processing unit 208 acquires the state of a flag SW1 from the RAM 203 and determines whether or not to perform correction processing based on the state of the flag SW1. In a case where the flag SW1 is OFF, the image processing unit 208 determines not to perform correction processing and advances the processing to step S404. Further, in a case where the flag SW1 is ON, the image processing unit 208 determines to perform correction processing and advances the processing to step S405.

In a case of determining not to perform correction processing at step S403, the image processing unit 208 acquires the state of a flag SW2 from the RAM 203 (S404). The image processing unit 208 outputs only the color image data to the PC/media 213 and prints it in a case where the flag SW2 is OFF and outputs the color image data and the distance image data to the PC/media 213 and prints them in a case where the flag SW2 is ON. Further, it is also possible for the image processing unit 208 to enable a user to check the image data by outputting the image data to the display unit 106 and causing the display unit 106 to display the image data. In a case where the image processing unit 208 performs the processing at step S404, the processing shown in FIG. 4 is terminated.

Figure 6:
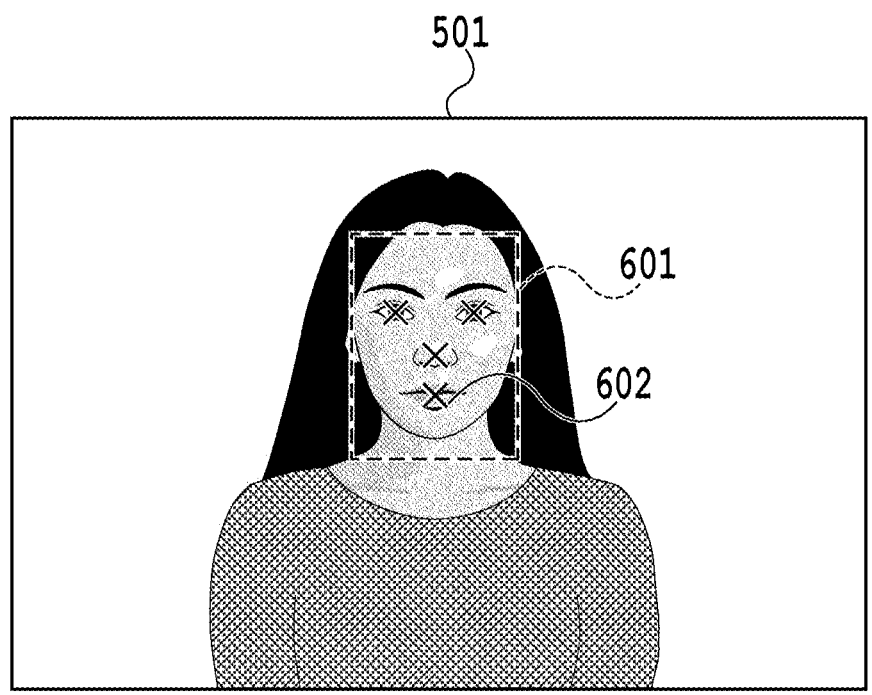
FIG. 6 is a diagram showing a face area and organ positions.

Further, in a case where it is determined to perform correction processing at step S403, the face detection unit 302 acquires face information based on the color image data 501 (S405). Here, the face information is explained by using FIG. 6. As shown in FIG. 6, in the face information, a face area 601 and organ positions 602 are included. The face area is indicated as a set of pixels in the area in which the face is included in the image data. The organ positions 602 are indicated as coordinates corresponding to the eye, nose, mouth, or the like within the face area. It is assumed that reliability is set to each of the face area 601 and the organ positions 602 and the higher the reliability is, the stronger the possibility that accurate position information has been acquired is.

As the detection method of a face area and an organ position, it is possible to apply an already-existing algorithm. As the already-existing algorithm, there are an algorithm using template matching, an algorithm using the Haar-Like feature amount, and the like and in the present embodiment, by applying the template matching, a face area and an organ position are detected.

In detection applying the template matching, first, a skin color area is extracted as a face candidate area by performing threshold-based processing for the color image data. Next, likelihood is calculated by performing matching processing for the face candidate area by using face image templates of a variety of sizes. Then, a face area is extracted by performing determination processing of whether or not the area is a face area based on the calculated likelihood. For the organ position also, the likelihood is calculated by similarly performing matching processing for the extracted face area by using image templates of the eye, nose, and mouth. Then, based on the degree of the likelihood, the reliability of the face area and the organ position is calculated. By performing the above processing, the face area 601 and the organ positions 602 are acquired.

The distance correction unit 303 corrects the distance image data (S406). Specifically, there is a case where a pixel with a defect of a distance value exists in the distance image data, and therefore, the distance correction unit 303 supplements the distance value based on the distance values of the peripheral pixels. Further, there is a case where an area that does not coincide with the color image data exists at the outline portion and the like, and therefore, the distance correction unit 303 corrects the area by performing smoothing processing that takes the color image data as a reference image. In the smoothing processing, it is possible to apply a joint bilateral filter and the like that takes the color image data as a reference image. The distance correction unit 303 generates corrected distance image data by applying the above processing to the distance image data.

The normal generation unit 304 generates integrated normal image data corresponding to the color image data (S407). First, the normal generation unit 304 generates object normal image data based on the corrected distance image data. Next, the normal generation unit 304 generates face normal image data based on the face information and the face normal information. Then, the normal generation unit 304 generates integrated normal image data by integrating the object normal image data and the face normal image data, both generated. Details of integrated normal image data generation processing will be described later.

The high-luminance area correction processing unit 305 generates high-luminance area corrected image data by suppressing the luminance value in the high-luminance area in the object face area of the object in the color image data (S408). Details of the high-luminance area correction processing will be described later.

The illumination parameter setting unit 306 sets an illumination parameter based on the high-luminance area of the object in the color image data and the integrated normal image data (S409). Details of illumination parameter setting processing will be described later.

The lighting processing unit 307 generates corrected image data, which is obtained by giving a highlight to the object in the high-luminance area corrected image data, based on the corrected distance image data, the integrated normal image data, and the illumination parameter (S410). Details of the lighting processing will be described later.

The lighting processing unit 307 determines whether or not to terminate the correction processing based on the user operation acquired from the control unit 205 (S411). Then, in a case of terminating the correction processing, the lighting processing unit 307 advances the processing to step S412 and in a case of not terminating the correction processing, the lighting processing unit 307 advances the processing to step S408 and performs again the high-luminance area correction processing and the lighting processing.

In a case of terminating the correction processing (Yes at S411), the lighting processing unit 307 acquires the state of the flag SW2 from the RAM 203 and outputs various kinds of data based on the state of the flag SW2 (S412). The lighting processing unit 307 outputs the corrected image data and the color image data to the PC/media 213 and prints them in a case where the flag SW2 is OFF and outputs the corrected image data, the color image data, and the distance image data to the PC/media 213 and prints them in a case where the flag SW2 is ON. After this, the image processing unit 208 terminates the processing shown in FIG. 4.

(Normal Image Data Generation Processing)

Here, normal image data generation processing performed by the normal generation unit 304 at step S407 is explained. As the normal image data generation processing at step S407, the normal generation unit 304 first generates object normal image data based on the corrected distance image data acquired from the distance correction unit 303. Next, the normal generation unit 304 generates face normal image data based on the face normal information and the face organ normal information, both acquired from the ROM 202. After generating the object normal image data and the face normal image data, the normal generation unit 304 further integrates those images and generates integrated normal image data.

Figure 7:
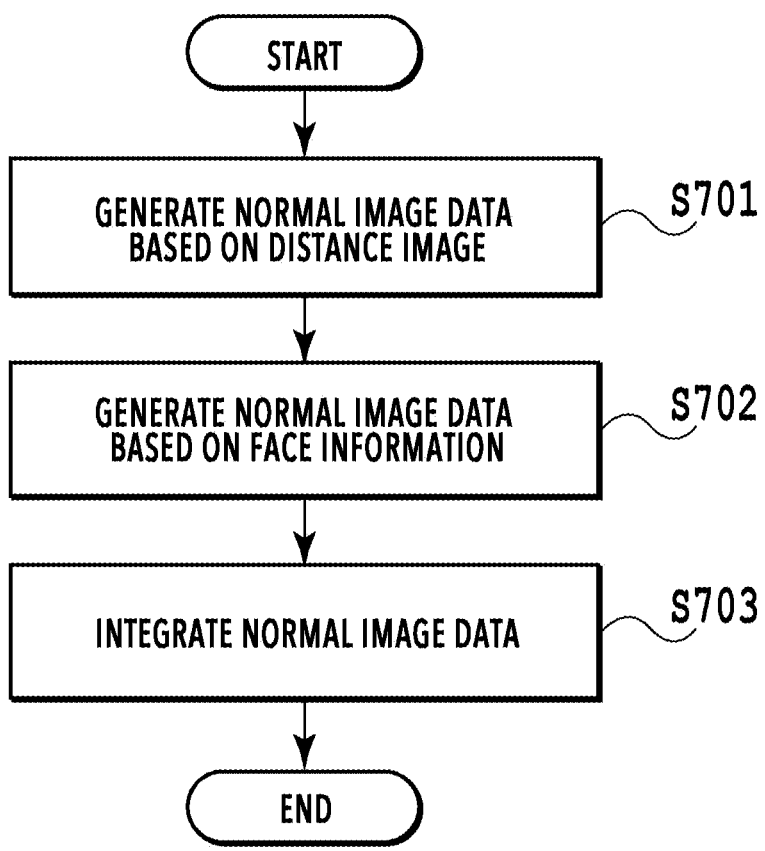
FIG. 7 is a flowchart showing a procedure of normal image data generation processing in a normal generation unit.

FIG. 7 is a flowchart showing a normal image data generation processing procedure in the normal generation unit 304. The normal generation unit 304 generates object normal image data based on the corrected distance image data (S701). Here, first, the normal generation unit 304 calculates three-dimensional coordinate values for each pixel based on two-dimensional coordinate values of each pixel in the corrected distance image data and the distance value stored in each pixel. Next, the normal generation unit 304 calculates a normal vector corresponding to each pixel based on the three-dimensional coordinate values.

As the method of calculating a normal vector, there is a method of calculating a normal vector based on the gradient calculated from three-dimensional coordinate values or a method of calculating a normal vector in which a plane is applied to each pixel and the perpendicular to the plane is taken as a normal vector, and in the present embodiment, a normal vector is calculated by the latter method.

In the following, a procedure to calculate a normal vector is explained in detail. First, three-dimensional coordinate values of the pixel that is a target of the calculation of a normal vector and pixels located in the vicinity of the pixel are taken to be $(x0, y0, z0), \ldots, (xn-1, yn-1, zn-1)$. Here, the x-coordinate value is found based on the coordinate value in the horizontal direction of the two-dimensional coordinate values and the y-coordinate value is found based on the coordinate value in the vertical direction of the two-dimensional coordinate values. Further, the z-coordinate value is found based on the distance value. Next, a plane $ax+by+c=z$ is applied to these coordinate values and a, b, and c that minimize a function E expressed by an equation below are found.

$$E = \Sigma_i (ax_i + by_i + c - z_i)^2 \quad \text{(Mathematical equation 1)}$$

In mathematical equation 1, it is possible to calculate a, b, and c by an equation below. Further, i indicated in mathematical equation 1 is indicated as an index value of a pixel.

$$\begin{bmatrix} a \\ b \\ c \end{bmatrix} = \begin{bmatrix} \sum_i x_i^2 & \sum_i x_i y_i & \sum_i x_i \\ \sum_i x_i y_i & \sum_i x_i^2 & \sum_i y_i \\ \sum_i x_i & \sum_i y_i & n \end{bmatrix}^{-1} \begin{bmatrix} \sum_i x_i z_i \\ \sum_i y_i z_i \\ \sum_i z_i \end{bmatrix} \quad \text{(Mathematical equation 2)}$$

Then, it is possible to calculate a vector $n=(nx, ny, nz)$ perpendicular to the plane $ax+by+c=z$ as in an equation below.

$$n_x = \frac{a}{\sqrt{a^2 + b^2 + 1}} \quad \text{(Mathematical equation 3)}$$

$$n_y = \frac{b}{\sqrt{a^2 + b^2 + 1}}$$

$$n_z = \frac{-1}{\sqrt{a^2 + b^2 + 1}}$$

As described above (that is, as shown in mathematical equation 3), the normal vector in the target pixel is calculated. Then, by performing the same processing for each pixel in the image data and calculating the normal vector, the object normal image data is generated. That is, the object normal image data is indicated as image data in which a normal vector (Nx (i, j), Ny (i, j), Nz (i, j) is stored in a pixel (i, j).

Figure 8A:
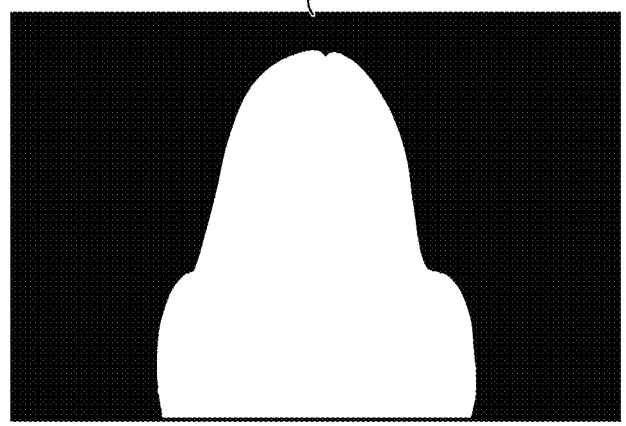
FIG. 8A is a diagram showing corrected distance image data.
Figure 8B:
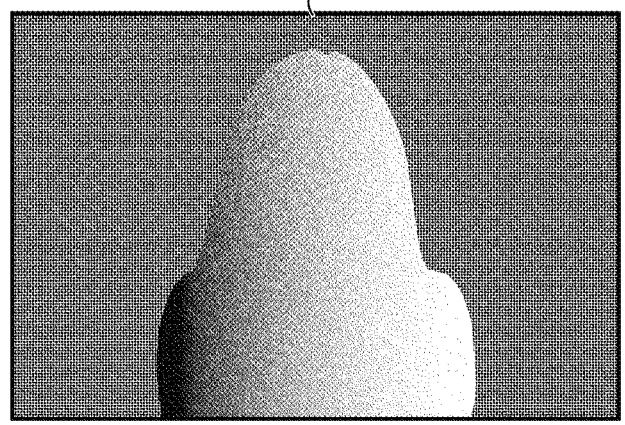
FIG. 8B is a diagram showing object normal image data.

FIG. 8A and FIG. 8B are diagrams showing an outline of object normal image data generation processing and FIG. 8A is a diagram showing corrected distance image data 801 and FIG. 8B is a diagram showing object normal image data 802 generated based on the normal vector calculated in accordance with the above-described method.

Figure 9A:
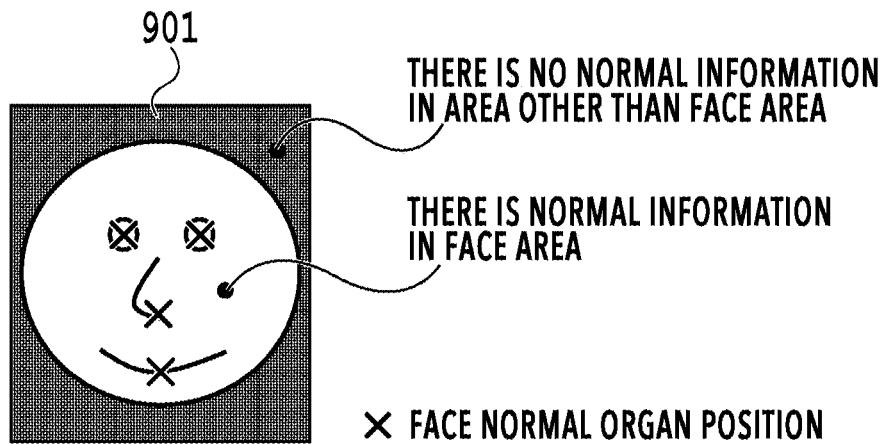
FIG. 9A is a diagram showing face normal information and face normal organ position information.
Figure 9B:
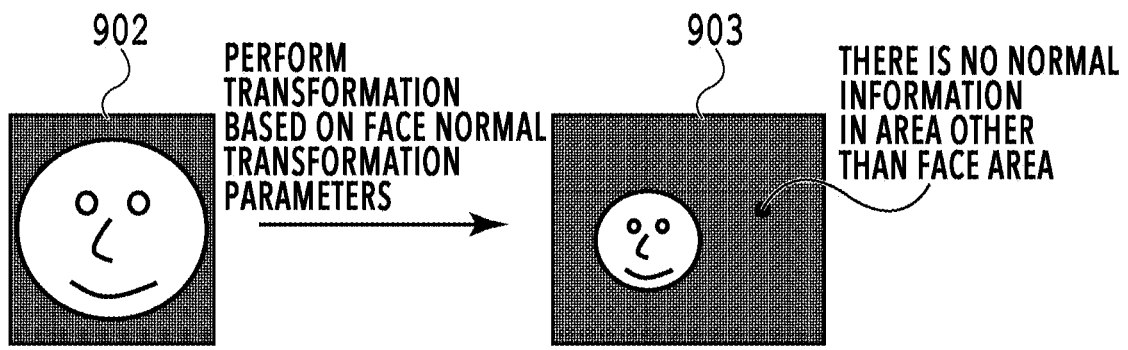
FIG. 9B is a diagram showing processing to transform face normal information.

After generating the object normal image data, the normal generation unit 304 generates face normal image data based on the face normal information (S702). In the following, the processing to generate face normal image data is explained in detail by using FIG. 9A and FIG. 9B. FIG. 9A and FIG. 9B are diagrams showing an outline of face normal image data generation processing and FIG. 9A shows face normal information and face normal organ position information, both stored in the ROM 202, and FIG. 9B shows processing to transform the face normal information as an example thereof.

Face normal information 901 shown in FIG. 9A is image data storing face normal information generated based on a general face shape as pixel values and in the pixel (i, j) corresponding to the face area, each component of the normal vector is stored as the pixel value. In the pixels other than the face area, a value indicating that there is no normal vector is stored, due to this, it is possible to determine the face area and the area other than the face area based on the pixel value (that is, normal vector). Further, as shown in FIG. 9A, face normal organ position information 902 corresponds to the face organs, such as the eye, nose, and mouth.

Next, by using FIG. 9B, the processing to transform the face normal information is explained. The normal generation unit 304 calculates a transformation parameter for transforming the face normal information in accordance with the object in the color image data based on the organ position 602 of the object included within the color image and the face normal organ position information 902 included in the face normal information.

As the transformation method of face normal information, for example, it is possible to apply affine transformation, projection transformation, and the like. In the present embodiment, it is assumed that the face normal information 901 is transformed by using affine transformation expressed in mathematical equation 4.

$$x' = a_0 x + a_1 y + a_2$$

$$y' = a_3 x + a_4 y + a_5 \quad \text{(Mathematical equation 4)}$$

In the equation (mathematical equation 4) above, it is possible to calculate transformation parameters (a0, a1, a2, a3, a4, a5) by applying the least square method or the like after associating the organ position 602 and the coordinates of the right eye, the left eye, the nose, and the mouth of the face normal organ position information 902 to each other.

After calculating the transformation parameters, the normal generation unit 304 transforms the face normal information 901 based on the calculated transformation parameters as shown in 903 in FIG. 9B and generates face normal image data 903. In the face normal image data 903, in the pixels other than the face area, a value indicating that there is no normal information is stored as the pixel value.

Figure 10:
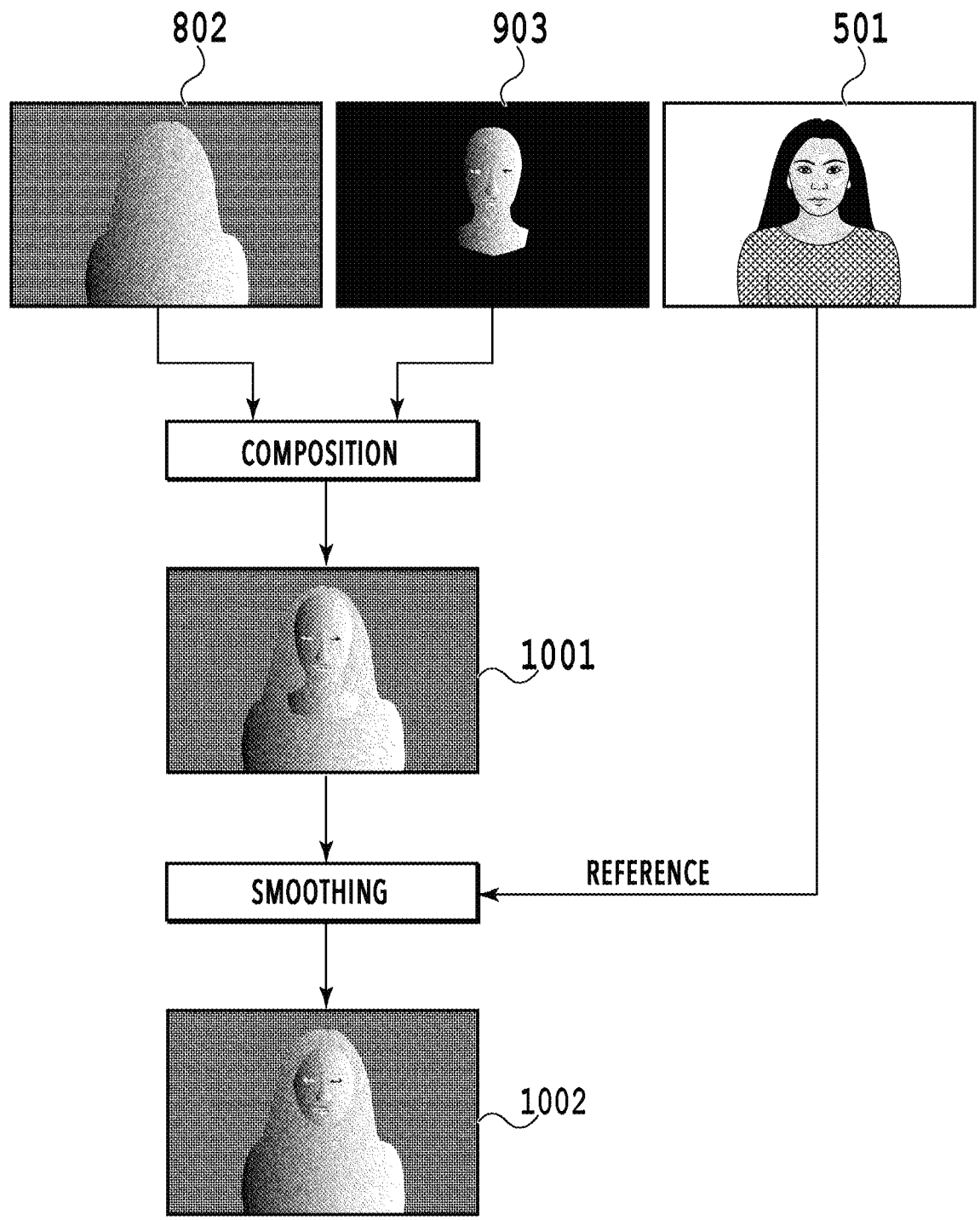
FIG. 10 is a diagram showing an outline of normal image data integration processing.

The normal generation unit 304 generates integrated normal image data by integrating the object normal image data and the face normal image data (S703). In the following, an outline of integration processing is explained by using FIG. 10. First, the normal generation unit 304 composes the object normal image data 802 and the face normal image data 903 by overwriting the object normal image data 802 by the pixel values of the pixels in which there is normal information of the face normal image data 902, and the like. Then, the normal generation unit 304 performs smoothing processing with the color image data 501 as a reference image for normal image data 1001, which is the composition results. The smoothing processing is performed by applying the joint bilateral filter or the like, which takes the color image data 501 as a reference image, to each pixel of the normal image data 1001.

After performing the smoothing processing, the normal generation unit 304 performs normalization processing so that the magnitude of the normal vector in each pixel becomes 1. The normal generation unit 304 generates integrated normal image data 1002 by performing the above processing. In the present embodiment, the image obtained by integrating the object normal image data 802 based on the corrected distance image data and the face normal image data 903 based on the face information is generated as the normal image data (that is, the integrated normal image data 1002), but the normal image data is not necessarily limited to this. Consequently, in place of the integrated normal image data 1002, for example, it is also possible to use the object normal image data 802 based on the corrected distance image data as the normal image data, or to use the face normal image data 903 based on the face information as the normal image data.

(High-Luminance Area Correction Processing)

Here, the high-luminance area correction processing performed by the high-luminance area correction processing unit 305 at step S408 is explained. As the high-luminance area correction processing at step S408, the high-luminance area correction processing unit 305 generates high-luminance area corrected image data by suppressing the luminance value of the high-luminance area of the object face area specified based on the face information in the color image data. Specifically, the high-luminance area correction processing unit 305 corrects the pixel value so that the color of the pixel in the high-luminance area becomes close to the skin color.

In the following, the processing to correct the high-luminance area is explained by using FIG. 11A to FIG. 11C. First, the high-luminance area correction processing unit 305 extracts the color whose occupancy is high as the face color of the object from the pixel values of the pixels included in the face area 601 of the color image data 501. Next, the high-luminance area correction processing unit 305 calculates the complementary color based on the extracted face color. After calculating the complementary color based on the face color, the high-luminance area correction processing unit 305 generates a weight map 1101 based on the face area 601, in which the pixel closer to the center of the face area has a heavier weight and the weight of the pixel in the area other than the face area is 0. It is assumed that the weight map 1101 indicates the degree of correction of each pixel in the correction processing and the pixel whose weight is heavier is corrected more thoroughly.

Then, after generating the weight map 1101, the high-luminance area correction processing unit 305 generates high-luminance area corrected image data I' in accordance with an equation (mathematical equation 5) below based on a complementary color U of the face color and a weight map w.

$$I'_r(i,j) = I_r(i,j) - tw(i,j)g(Y(i,j))U_r$$

$$I'_g(i,j) = I_g(i,j) - tw(i,j)g(Y(i,j))U_g$$

$$I'_b(i,j) = I_b(i,j) - tw(i,j)g(Y(i,j))U_b \quad \text{(Mathematical equation 5)}$$

Here, in mathematical equation 5, Ir, Ig, and Ib are pixel values of color image data I, I'r, I'g, and I'b are pixel values of the high-luminance area corrected image data I', Y is a luminance value of the color image data I, and t is a parameter that controls the degree of correction.

In addition, a weight g is set as a function whose value becomes larger as the luminance value Y becomes larger. That is, by the weight g, it is possible to correct the pixel whose luminance value Y is larger more thoroughly. It is also possible to set the parameter t and the weight g that control the degree of correction based on the user operation. Further, the correction processing (correction method) of the high-luminance area is not necessarily limited to the above-described processing. Consequently, for example, after the high-luminance area is extracted based on the luminance value, for the high-luminance area, it is also possible to correct the color to a color that resembles the pixel value of the pixel around the high-luminance area.

As above, by causing the pixel whose luminance is high to have a heavy weight and subtracting the complementary color of the face color, it is possible to correct the color to a color close to the face color while reducing the luminance for the high-luminance area. A high-luminance area corrected image 1102 corrected by the high-luminance area correction processing unit 305 is shown as in FIG. 11C.

(Illumination Parameter Setting Processing)

Here, the illumination parameter setting processing performed by the illumination parameter setting unit 306 at S409 is explained. As the illumination parameter setting processing at S409, the illumination parameter setting unit 306 sets the orientation of the illumination, which is included in the illumination parameter, based on the high-luminance area of the object in the color image data 501 and the integrated normal image data. That is, the illumination parameter setting unit 306 functions as a virtual illumination parameter setting unit.

Figure 12:
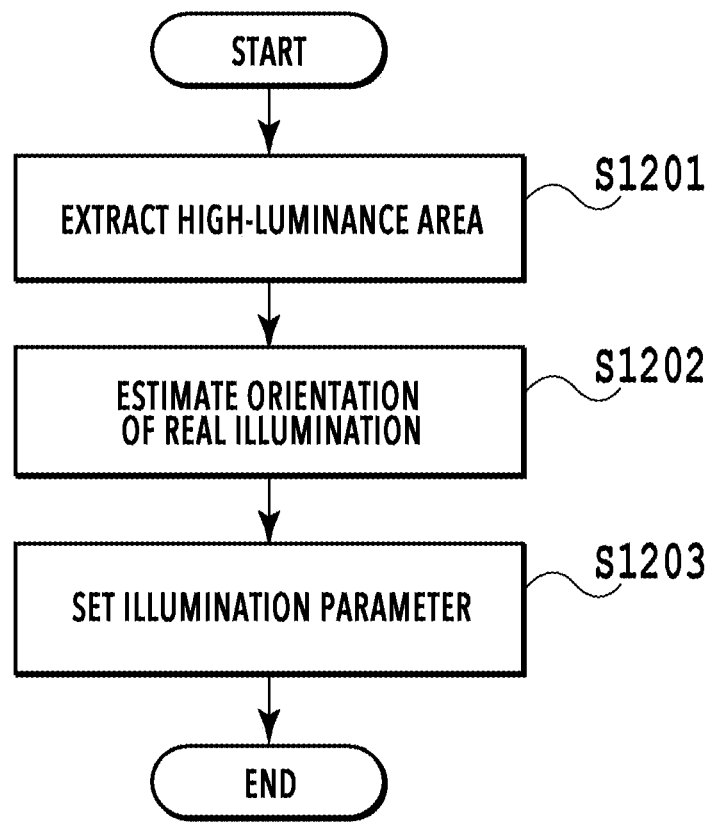
FIG. 12 is a flowchart showing a procedure of illumination parameter setting processing in an illumination parameter setting unit.
Figure 13A:
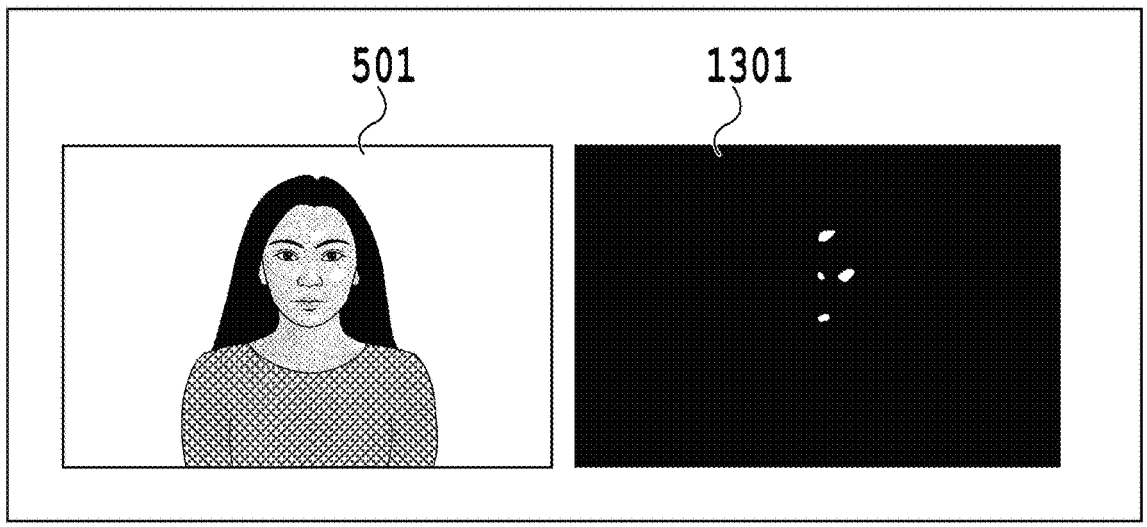
FIG. 13A is a diagram showing a high-luminance area extracted from color image data.

In the following, the processing to set an illumination parameter is explained by using FIG. 12. First, the illumination parameter setting unit 306 extracts a high-luminance area in the color image data 501 (S1201). For example, the illumination parameter setting unit 306 acquires the high-luminance area by applying the threshold-based processing based on the luminance value to the color image data and extracting only the pixels whose luminance value is larger than a predetermined threshold value. It is also possible for the illumination parameter setting unit 306 to extract the high-luminance area based on the difference between the color image data 501 and the high-luminance area corrected image data. Here, a high-luminance area 1301 extracted from the color image data 501 by the illumination parameter setting unit 306 is shown as 1301 in FIG. 13A.

Figure 13B:
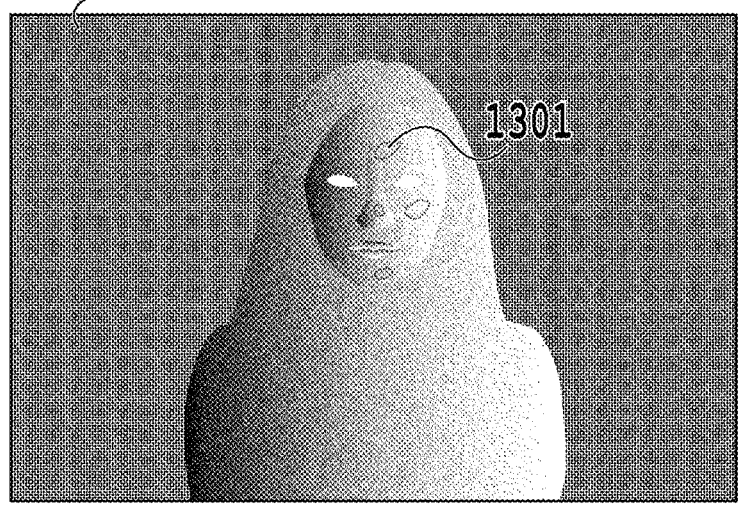
FIG. 13B is a diagram showing a high-luminance area in integrated normal image data.

Next, the illumination parameter setting unit 306 estimates the orientation of the real illumination for the object based on the high-luminance area 1301 and the integrated normal image data 1002 (S1202). The orientation of the real illumination is estimated based on the normal vector of the pixel included in the high-luminance area 1301 extracted from the integrated normal image data 1002 as shown in FIG. 13B. More specifically, the illumination parameter setting unit 306 averages the normal vectors of the pixels included in the high-luminance area 1301 of the integrated normal image data 1002 and further, estimates a reverse vector of the averaged vector as a real illumination parameter (specifically, an orientation U' of the real illumination).

It is also possible to estimate the orientation of the real illumination by using the normal vector whose occupancy is high in place of averaging the normal vectors of the pixels included in the high-luminance area 1301 at step S1202. By estimating the orientation of the real illumination in this manner, it is possible to reduce the influence of a few normal vectors facing obviously in different directions.

After estimating the orientation U' of the real illumination at step S1202, the illumination parameter setting unit 306 sets an orientation U of the virtual illumination based on the orientation U' of the real illumination (S1203). In the present embodiment, in accordance with an equation (mathematical equation 6) below, by weighting of the orientation U' of the real illumination and a target illumination parameter U" set in advance (specifically, an orientation U" of the target illumination), the orientation U of the virtual illumination is set.

$$U = \frac{(1-w')U' + w'U''}{|(1-w')U' + w'U''|} \quad \text{(Mathematical equation 6)}$$

Here, in mathematical equation 6, w' is a weight of the orientation U" of the target illumination and it is desirable to set the orientation U" of the target illumination so that the orientation U of the virtual illumination does not separate (open) from the orientation U of the real illumination more than or equal to a predetermined angle. Consequently, it is sufficient to set the weight w' of the orientation U" of the target illumination so that the weight w' becomes small as an angle θ formed by the orientation U' from the irradiation-target pixel to the real illumination and the orientation U" from the irradiation-target pixel to the target illumination becomes large.

Figure 13C:
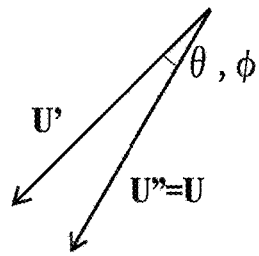
FIG. 13C is a diagram for explaining setting of a weight of an orientation of a target illumination.
Figure 13D:
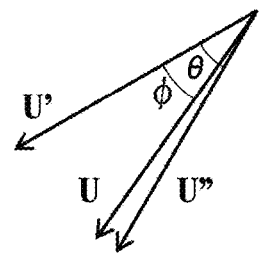
FIG. 13D is a diagram for explaining setting of a weight of an orientation of a target illumination.
Figure 13E:
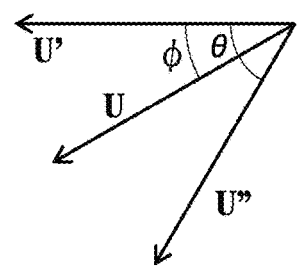
FIG. 13E is a diagram for explaining setting of a weight of an orientation of a target illumination.

In order to make understanding easy, the setting of the weight w' of the orientation U" of the target illumination is supplemented by using FIG. 13C to FIG. 13E. First, as shown in FIG. 13C, in a case where the angle θ formed by the orientation U' of the real illumination and the orientation U" of the target illumination is smaller than a predetermined angle, w' of the orientation U" of the target illumination is set to 1 so that U becomes equal to U" (U=U") (that is, the orientation U of the virtual illumination is caused to align with the orientation U" of the target illumination).

Next, a case where the angle θ formed by the orientation U' of the real illumination and the orientation U" of the target illumination is larger than the predetermined angle is shown in FIG. 13D and FIG. 13E. In this case, the weight w' of the orientation U" of the target illumination is set to a value smaller than 1 (that is, in view of the orientation U' of the real illumination, the orientation U of the virtual illumination is adjusted). Further, as shown in the relationships in FIG. 13D and FIG. 13E, by reducing the weight w' of the orientation U" of the target illumination as the angle θ increases more than the predetermined angle, an angle φ formed by the orientation U of the virtual illumination and the orientation U' of the real illumination is limited from exceeding a predetermined value. The reason is that a sense of incongruity occurs resulting from a relationship between the shade that occurs by the real illumination and the highlight given by the lighting processing in the post process in a case the angle φ formed by the orientation U of the virtual illumination and the orientation U' of the real illumination is not limited and becomes large. It is possible to set the weight w' of the orientation U" of the target illumination by, for example, as an equation (mathematical equation 7) below.

$$w' = \begin{cases} 1 & (\theta \leq \theta_{th}) \\ \frac{1-\cos\theta_{th}}{1-\cos\theta} & (\theta_{th} < \theta) \end{cases} \quad \text{(Mathematical equation 7)}$$

As expressed by the above equation (mathematical equation 7), the weight w' of the orientation U" of the target illumination is set in accordance with the angle θ formed by the orientation U' of the real illumination and the orientation U" of the target illumination. Specifically, in a case where the angle θ is larger than a predetermined angle $\theta_{th}$, the weight w' of the orientation U''' of the target illumination is set smaller as the angle θ becomes larger. That is, the angle φ formed by the orientation U of the virtual illumination and the orientation U' of the real illumination becomes the constant angel $θ_{th}$ (FIG. 13D, FIG. 13E). Further, in a case where the angle θ formed by the orientation U' of the real illumination and the orientation U''' of the target illumination is less than or equal to the predetermined angle $θ_{th}$, the angle φ formed by the orientation U of the virtual illumination and the orientation U of the real illumination becomes the angle θ (FIG. 13C).

As above, the processing to set the illumination parameter is explained, but it is also possible to set the orientation U of the virtual illumination by changing the angle by a predetermined value for the estimated orientation U' of the real illumination without using the orientation U''' of the target illumination. Consequently, it is also possible to set the orientation obtained by correcting the orientation of the normal vector so that the illumination comes from a more upward direction based on the estimated orientation U' of the real illumination as the orientation U of the virtual illumination. Further, in a case where image capturing is performed by using the electronic flash 104, it is also possible to set the orientation U' of the real illumination based on the position of the electronic flash. For example, in a case where the electronic flash is arranged as shown in FIG. 1A, it is possible to set the orientation substantially parallel to the optical axis of the image capturing apparatus as the orientation U' of the real illumination. In this case, it is possible to omit the processing at step S1201 and step S1202.

(Lighting Processing)

Here, the lighting processing performed by the lighting processing unit 307 at step S410 is explained. As the lighting processing at step S410, the lighting processing unit 307 generates corrected image data in which a highlight is given to the object in the high-luminance area corrected image data based on the corrected distance image data, the integrated normal image data, and the illumination parameters.

In the present embodiment, it is assumed that the orientation U of the virtual illumination, an intensity α, and a illuminant color L are set as the illumination parameters and corrected image data I''' is generated in accordance with an equation (mathematical equation 8) below.

$$I''_r(i,j) = I'_r(i,j) + \sum_m as(i,j)L_{r,m}$$
$$I''_g(i,j) = I'_g(i,j) + \sum_m as(i,j)L_{g,m}$$
$$I''_b(i,j) = I'_b(i,j) + \sum_m as(i,j)L_{b,m}$$

(Mathematical equation 8)

Here, I''r, I''g, and I''b are pixel values of the corrected image data I''' and Lrm, Lgm, and Lbm are colors of the mth illumination. Further, s is a value indicating the intensity of gloss by the virtual illumination and it is possible to calculate s in accordance with the already-existing Blinn-Phone model, the Torrance-Sparrow model, and the like, which represent specular reflection and for example, s is expressed by an equation (mathematical equation 9) below.

$$s(i,j) = β(H(i,j) \cdot N(i,j))^c$$  (Mathematical equation 9)

Figure 14A:
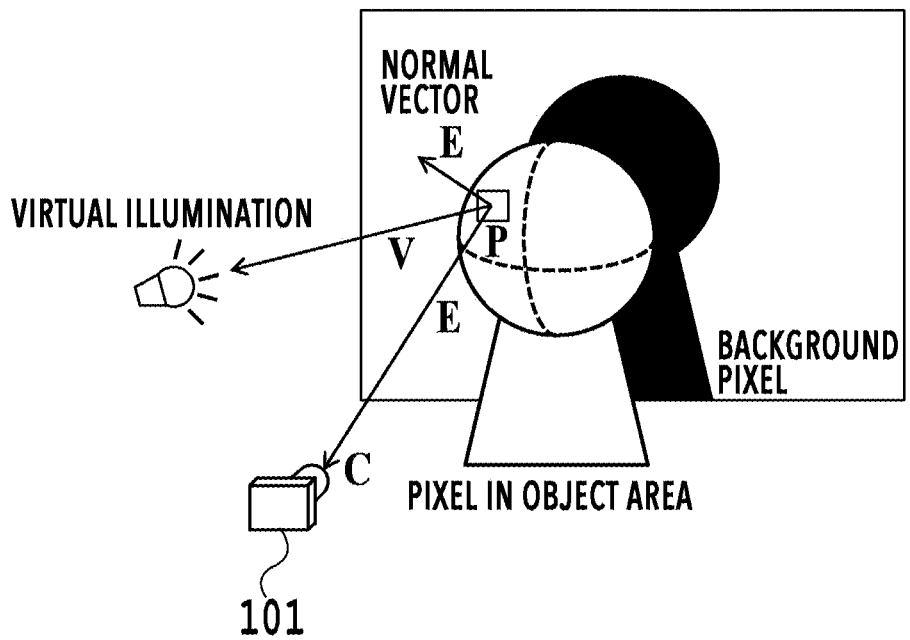
FIG. 14A is a diagram showing an outline of lighting processing.
Figure 14B:
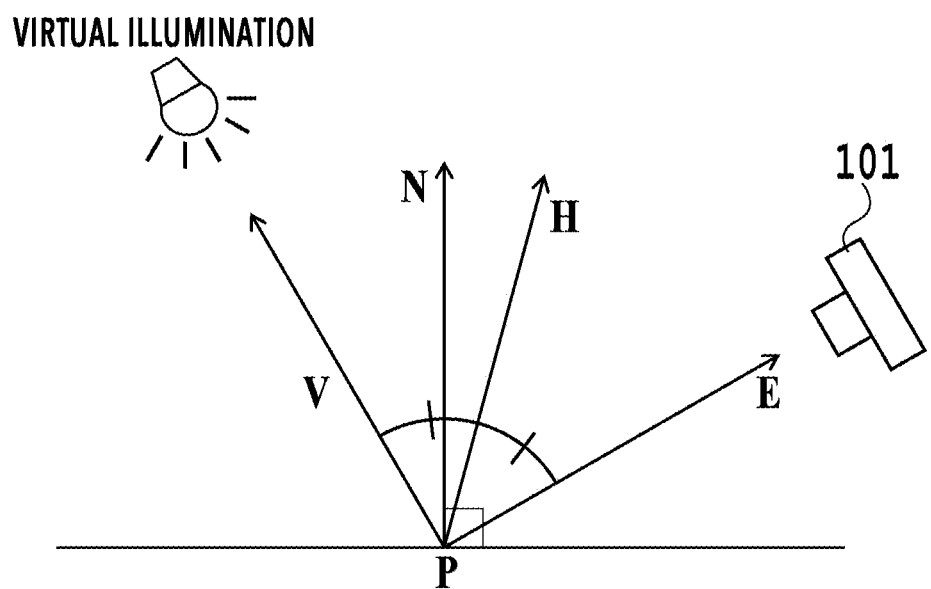
FIG. 14B is a diagram showing an outline of lighting processing.

In the following, mathematical equation 9 is explained by using FIG. 14A and FIG. 14B. In mathematical equation 9, β is a specular reflectance and c is a parameter indicating the spread of gloss. The larger the value of the parameter c, the sharper the gloss is and the smaller the value, the softer the gloss is. Further, as expressed in mathematical equation 9, the gloss sensitively changes by the shape represented by a normal vector N. H indicates a half vector and as shown in FIG. 14A and FIG. 14B, H is obtained by normalizing the magnitude of the average vector of a unit vector V whose direction is from a position P of the pixel (i, j) toward the virtual illumination and a unit vector E whose direction is from the position P toward a position C corresponding to the image capturing apparatus 101 to 1. Further, in the present embodiment, it is assumed that the unit vector V is the reverse vector of the orientation U of the virtual illumination.

Figure 15:
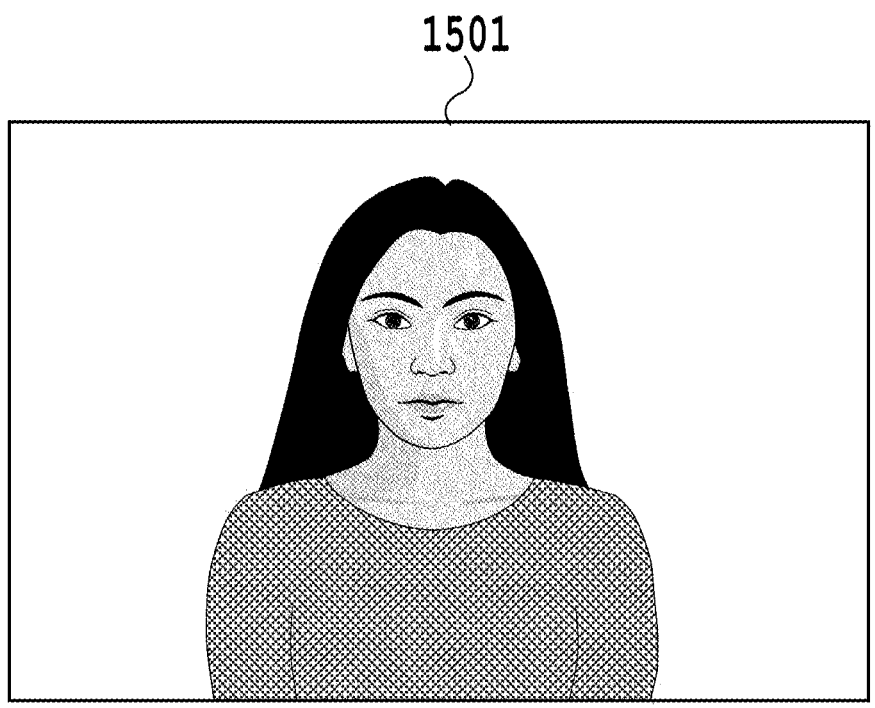
FIG. 15 is a diagram showing corrected image data.

As expressed by mathematical expression 9, in the high-luminance area corrected image data, it is possible to give an appropriate gloss to a desired pixel position by giving a higher highlight to the pixel whose normal vector N faces a direction closer to the direction of the half vector H. As a supplement, corrected image data 1501 in which a highlight is given to the object by the processing shown at step S410 is shown as FIG. 15. Further, it is also possible to perform the lighting processing by limiting the application range of the processing to the range around the face based on the face area 601.

As above, by the image processing apparatus according to the present embodiment, it is possible to generate an image with a three-dimensional effect by giving a gloss to the object by the virtual illumination after correcting the high-luminance area of the object, which has occurred by the illumination at the time of image capturing.

Second Embodiment

In the first embodiment described previously, the orientation of the real illumination is estimated based on only the normal vector included in the high-luminance area, but in the present embodiment, the orientation of the real illumination is estimated by performing weighting for each normal vector based on reliability of the normal map. That is, in the present embodiment, the processing to estimate the orientation of the real illumination is different from the processing of the first embodiment and the illumination parameter setting unit 306 includes a reliability setting unit configured to set reliability.

Figure 16:
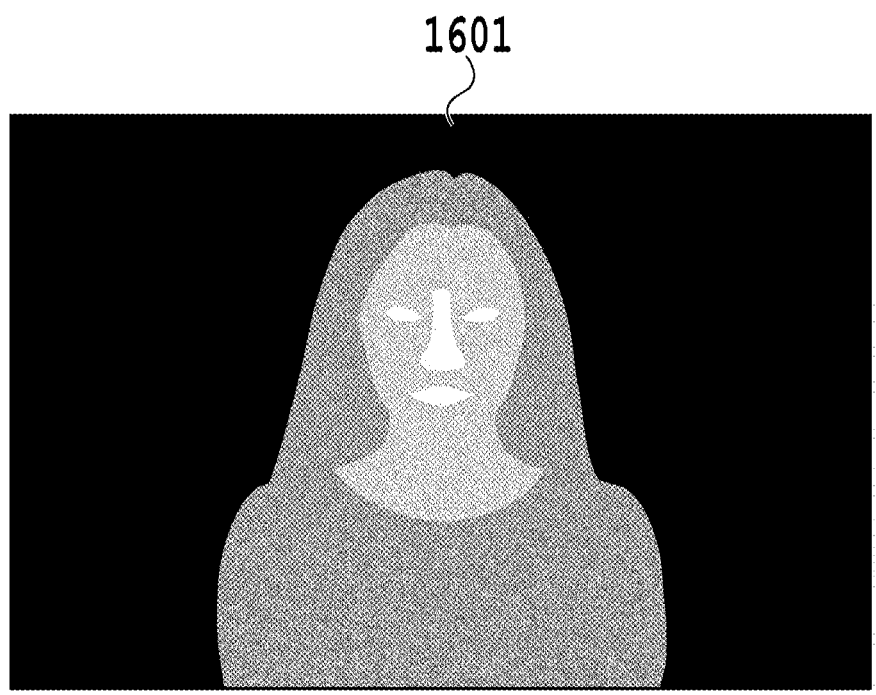
FIG. 16 is a diagram showing a weight map used in an image processing apparatus according to a second embodiment.

In the second embodiment, based on a weight map 1601 corresponding to the integrated normal image data as shown in FIG. 16, weighting is performed so that a heavier weight is given to a normal vector whose reliability is higher. Then, a weighted average of the normal vectors included in the high-luminance area is calculated and further, the reverse vector of the weighted-average vector is estimated as the orientation U' of the real illumination.

Here, the weight map 1601 is created based on the distance map and the face area, the organ position, and the like included in the face information. In the present embodiment, four levels of reliability are set and reliability is set high in order of the area around the organ position, the face area other than the area around the organ position, the area in the vicinity of the face area (that is, the area within a predetermined range whose distance from the face area is short), and the other areas.

For the face area and the organ position, it is also possible to change reliability in accordance with credibility at the time of detection. Consequently, for example, in a case where the credibility corresponding to the organ position of the mouth is low, it is also possible to reduce the weight of only the area around the mouth compared to those of the other organ positions and set the weight to the same weight of the face area.

Further, other than the weights that are set based on the face area, the organ position, and the like, it is also possible to perform weighting so that a heavier weight is set to the normal vector whose luminance value is higher by referring to the color image data. By performing weighting in this manner, it is possible to preferentially use the normal vector of the pixel whose luminance value is large, which is considered to face the direction of the illumination, and therefore, it is possible to acquire the surer orientation of the illumination. By the above processing, it is possible to estimate the orientation of the real illumination after reducing the influence of the normal vector whose reliability is low.

Third Embodiment

In the embodiment described above, the predetermined value is set in advance to the orientation U" of the target illumination, but in the present embodiment, the value of U" is calculated based on the integrated normal image data and a highlight candidate area. That is, in the present embodiment, the illumination parameter setting processing at S409 is different from the processing in the above-described embodiment.

Figure 17:
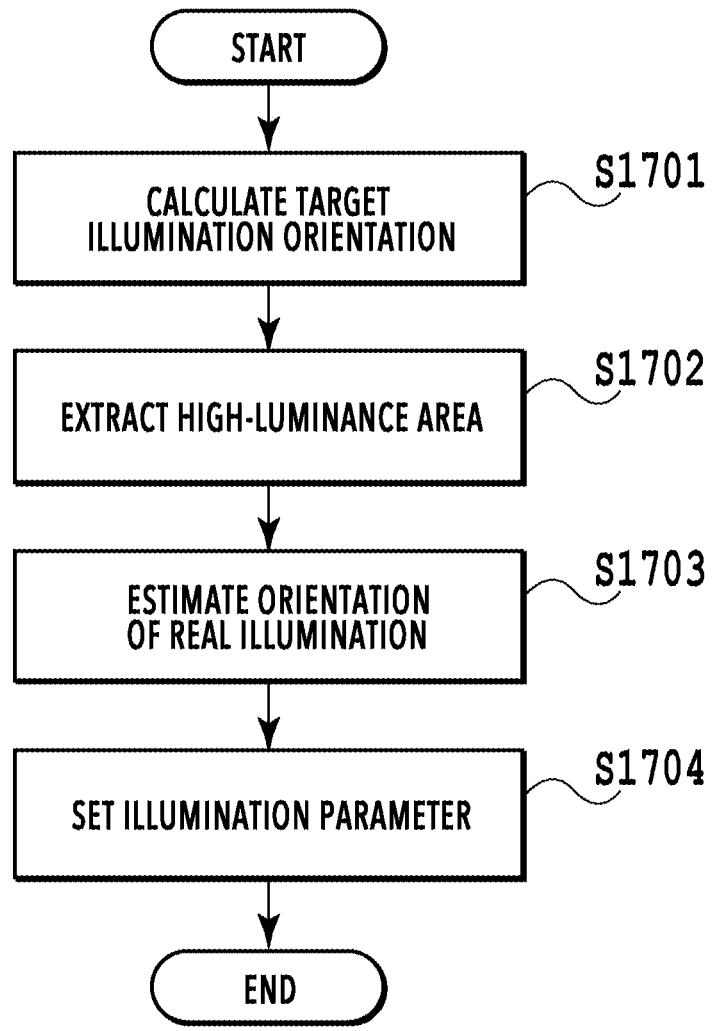
FIG. 17 is a flowchart showing a procedure of illumination parameter setting processing in an illumination parameter setting unit of an image processing apparatus according to a third embodiment.

FIG. 17 is a flowchart showing a procedure of illumination parameter setting processing in the third embodiment. The illumination parameter setting unit 306 calculates the target illumination orientation U" based on the integrated normal image data and the highlight candidate area (S1701). The illumination parameter setting unit 306 includes a highlight candidate area setting unit configured to set a highlight candidate area and in the present embodiment, the highlight candidate area is set based on the organ position.

Figure 18:
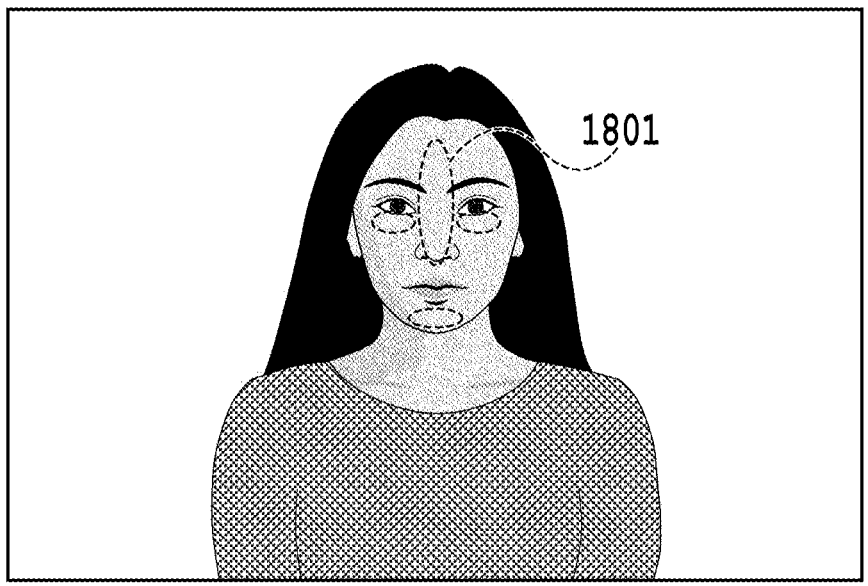
FIG. 18 is a diagram showing a highlight candidate area used in the image processing apparatus according to the third embodiment.

FIG. 18 is a diagram showing a highlight candidate area 1801 as an example thereof. As the highlight candidate area, the area effective to cause the face to be seen more three-dimensionally is set preferentially based on the organ position. Consequently, for example, as shown in FIG. 18, as the highlight candidate area, mention is made of the nose bridge area that is set based on the organ position of the nose, the chin area that is set based on the organ position of the mouth, the outer canthus area that is set based on the organ position of the eye, and the like. Then, from the integrated normal image data, the normal vectors included in these highlight candidate areas are averaged and further, the reverse vector of the averaged vector is calculated as the target illumination orientation U".

It is also possible to set the highlight candidate area in advance or select from among a plurality of areas based on a user operation. Further, the processing at step S1702 to step S1704 is the same processing as the processing explained in the first embodiment. By the above processing, it is possible to give a highlight to a favorable position in accordance with the object by calculating the target illumination orientation U".

Fourth Embodiment

In the embodiment described above, the high-luminance area of the object is corrected by the high-luminance area correction processing unit 305 performing the high-luminance area correction processing. In the present embodiment, by the lighting processing unit 307 performing the lighting processing, the high-luminance area of the object is corrected and a highlight is given.

Figure 19:
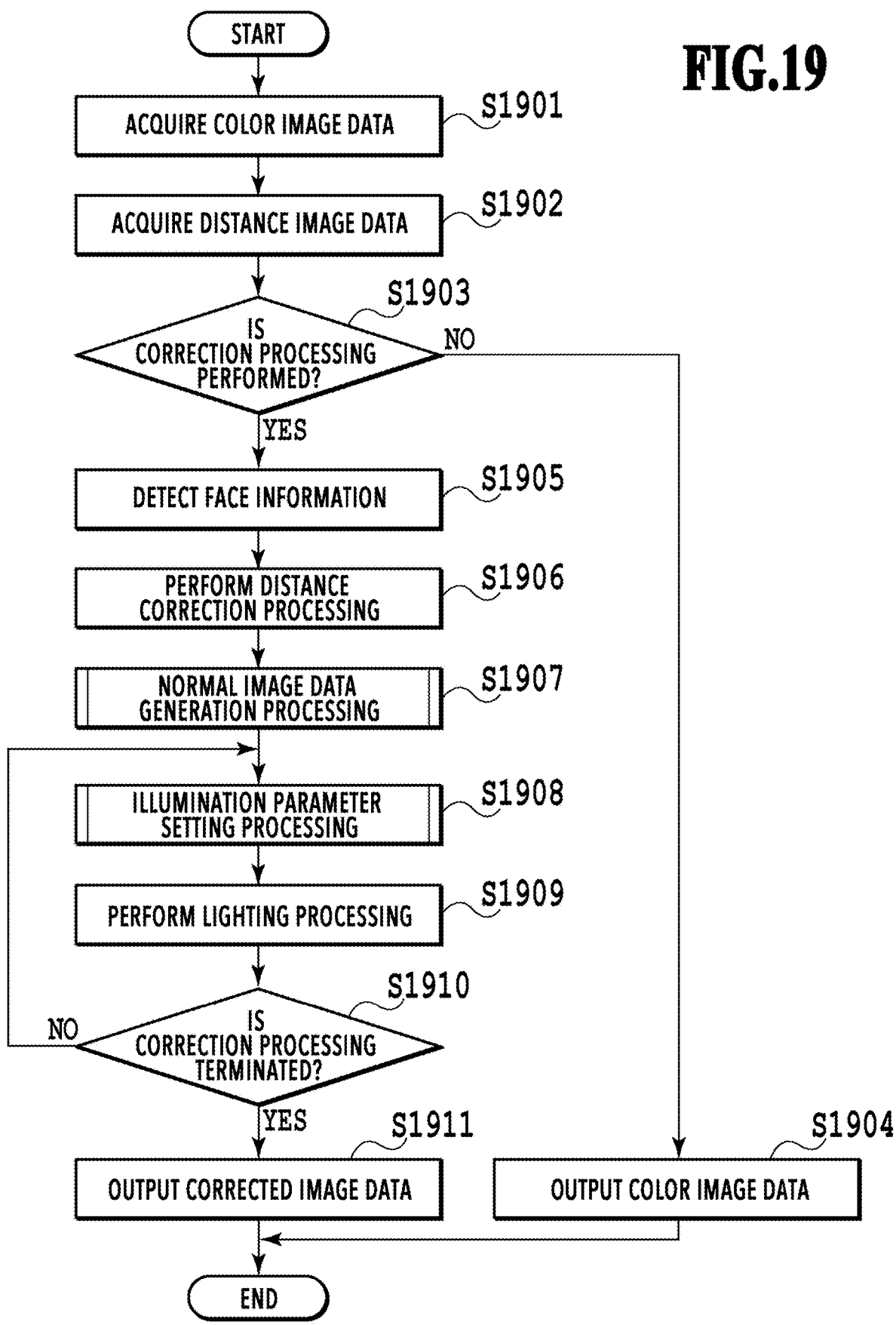
FIG. 19 is a flowchart showing a procedure of processing in an image processing apparatus according to a fourth embodiment.

FIG. 19 is a flowchart showing a procedure of processing in the image processing apparatus (image processing unit 208) according to the present embodiment. As shown in FIG. 19, this flowchart differs from the flowchart shown in FIG. 4 (that is, the flowchart showing the procedure of the processing in the image processing apparatus according to the first embodiment) in not performing the high-luminance area correction processing. Further, as described above, the processing contents of the lighting processing at S1909 are different. The other processing is the same as the processing shown in FIG. 4.

(Lighting Processing)

Here, the lighting processing performed by the lighting processing unit 307 at step S1909 is explained. Specifically, as the lighting processing, processing to generate corrected image data, which is obtained by correcting the highlight for the object in the color image data, based on the corrected distance image data, the integrated normal image data, and the illumination parameters is explained.

In the present embodiment, as the illumination parameters, the orientation U of the virtual illumination, the intensity $\alpha$, the illuminant color L, the orientation U' of the real illumination, an intensity $\alpha'$, and a illuminant color L' are set. It is possible to set a plurality of parameters as these parameters and it is possible to set parameters respectively in accordance with a number m of virtual illuminations and a number n of real illuminations.

Then, the corrected image data is generated by adding the effect of the virtual illumination corresponding to the orientation U of the virtual illumination, the intensity $\alpha$, and the illuminant color L to the color image data and subtracting the effect of the virtual illumination corresponding to the orientation U' of the real illumination, the intensity $\alpha'$, and the illuminant color L' from the color image data. Specifically, it is assumed that the corrected image data I" is generated in accordance with an equation (mathematical equation 10) below.

$$I''_r(i,j)=I_r(i,j)-S_r^-(i,j)+S_r^+(i,j)$$

$$I''_g(i,j)=I_g(i,j)-S_g^-(i,j)+S_g^+(i,j)$$

$$I''_b(i,j)=I_b(i,j)-S_b^-(i,j)+S_b^+(i,j) \quad \text{(Mathematical equation 10)}$$

Here, S+ is an additional gloss component and expressed as an equation (mathematical equation 11) below. By adding S+ to the color image data, it is possible to give an appropriate gloss to the object. The number m of virtual illuminations corresponds to the number of virtual illuminations to be added.

$$S_r^+(i,j)=\Sigma_m \alpha_m s_m(i,j)L_{r,m}$$

$$S_g^+(i,j)=\Sigma_m \alpha_m s_m(i,j)L_{g,m}$$

$$S_b^+(i,j)=\Sigma_m \alpha_m s_m(i,j)L_{b,m} \quad \text{(Mathematical equation 11)}$$

Further, S− is a subtractive gloss component and expressed as an equation (mathematical equation 12) below. By subtracting S− from the color image data, it is possible to suppress the high-luminance area of the object. The number n of real illuminations corresponds to the number of virtual illuminations to be subtracted.

$$S_r^-(i,j)=\Sigma_n \alpha'_n s'_n(i,j)L'_{r,n}$$

$$S_g^-(i,j)=\Sigma_n \alpha'_n s'_n(i,j)L'_{g,n}$$

$$S_b^+(i,j)=\Sigma_n \alpha'_n s'_n(i,j)L'_{b,n} \quad \text{(Mathematical equation 12)}$$

Figure 20:
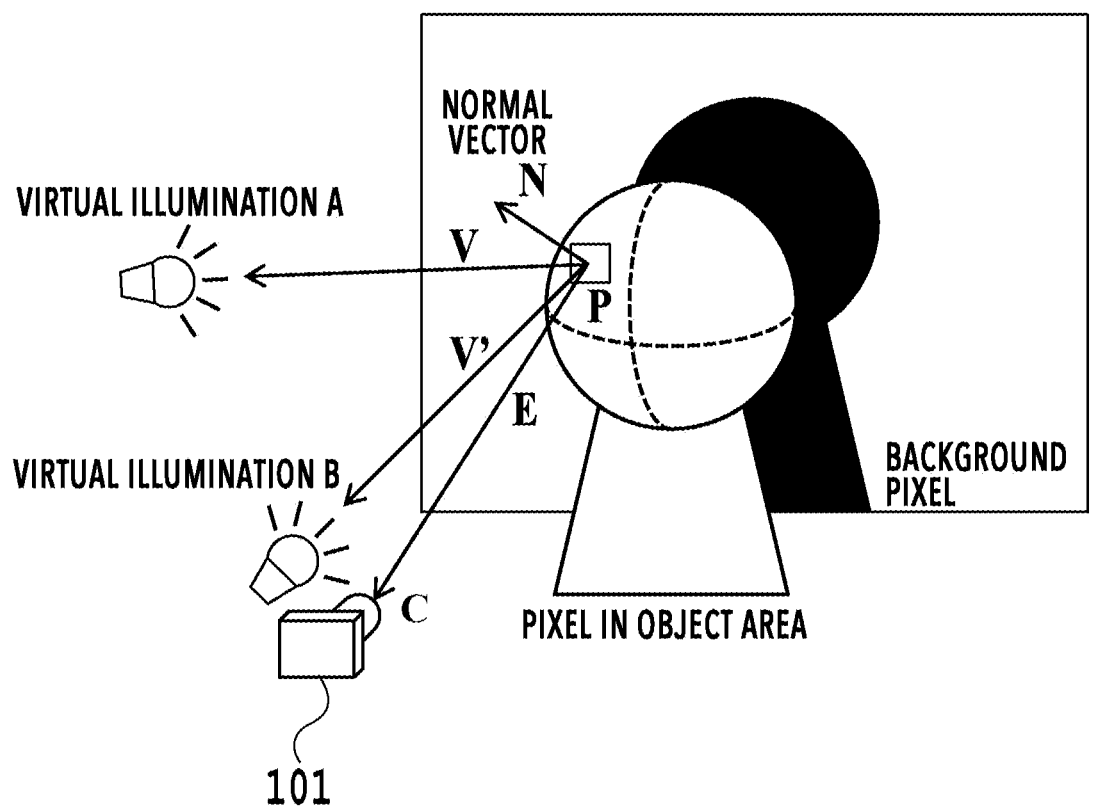
FIG. 20 is a diagram for supplementing explanation of lighting processing.

In the following, sm and s'n are explained supplementally by using FIG. 20. Here, it is assumed that the orientation of a virtual illumination A is U and the orientation of a virtual illumination B is U'. As shown in FIG. 20, the orientation U' of the virtual illumination B corresponds to the orientation of the real illumination.

Here, sm is a value indicating the intensity of gloss based on the orientation U of the virtual illumination. Specifically, sm is calculated in accordance with mathematical equation 9 based on the half vector H that is found from a reverse vector V of U and the unit vector E, and the normal vector N. Further, in the present embodiment, based on sm, the additional gloss component S+ is calculated.

Next, s'n is a value indicating the intensity of gloss based on the orientation U' of the real illumination. Specifically, s'n is calculated in accordance with mathematical equation 9 based on a half vector H' that is found from a reverse vector V' of U' and the unit vector E, and the normal vector N. Further, in the present embodiment, based on s'n, the subtractive gloss component S− is calculated.

Then, by subtracting the subtractive gloss component S− corresponding to the gloss component due to the real illumination at the time of image capturing from the color image data, the high-luminance area due to the gloss at the time of image capturing is corrected.

As above, by the image processing apparatus according to the present embodiment, it is possible to generate an image with a three-dimensional effect by correcting the high-luminance area of the object and giving a gloss to the object by the lighting processing.

Fifth Embodiment

In the embodiment described above, only the high-luminance area (that is, gloss) of the object is corrected. In the present embodiment, not only the gloss of the object but also the shade is corrected. By a comparison, the present embodiment differs from the fourth embodiment in the contents of mathematical equation 10. Specifically, it is assumed that the corrected image data I'' is generated in accordance with an equation (mathematical equation) below.

$$I''_r(i,j)=I'''_r(i,j)-T_r^-(i,j)+T_r^+(i,j))+S_r^+(i,j)$$

$$I''_g(i,j)=I'''_g(i,j)-T_g^-(i,j)+T_g^+(i,j))+S_g^+(i,j)$$

$$I''_b(i,j)=I'''_b(i,j)-T_b^-(i,j)+T_b^+(i,j))+S_b^+(i,j) \quad \text{(Mathematical equation 13)}$$

Here, I''' is obtained by subtracting the subtractive gloss component S− from the color image data and expressed as mathematical equation 14.

$$I'''_r(i,j)=I_r(i,j)-S_r^-(i,j)$$

$$I'''_g(i,j)=I_g(i,j)-S_g^-(i,j)$$

$$I'''_b(i,j)=I_b(i,j)-S_b^-(i,j) \quad \text{(Mathematical equation 14)}$$

Further, T+ is an additional shade component and expressed as an equation (mathematical equation 15) below. By adding T+, it is possible to give a shade due to the real illumination.

$$T_r^+(i,j)=\Sigma_m\alpha_m t_m(i,j)I'''_r(i,j)$$

$$T_g^+(i,j)=\Sigma_m\alpha_m t_m(i,j)I'''_g(i,j)$$

$$T_b^+(i,j)=\Sigma_m\alpha_m t_m(i,j)I'''_b(i,j) \quad \text{(Mathematical equation 15)}$$

Furthermore, T− is a subtractive shade component and expressed as an equation (mathematical equation 16) below. By subtracting T−, it is possible to suppress the shade due to the real illumination.

$$T_r^-(i,j)=\Sigma_n\alpha_n t_n(i,j)I'''_r(i,j)$$

$$T_g^-(i,j)=\Sigma_n\alpha_n t_n(i,j)I'''_g(i,j)$$

$$T_b^-(i,j)=\Sigma_n\alpha_n t_n(i,j)I'''_b(i,j) \quad \text{(Mathematical equation 16)}$$

Here, tm and tn are values indicating the intensity of the shade due to the virtual illumination and it is possible to calculate tm and tn in accordance with, for example, an equation (mathematical equation 17) below in accordance with the already-existing Phong model indicating diffused reflection, and the like. Here, δ is a parameter indicting the diffuse reflectance.

$$t(i,j)=\delta(V(i,j)\cdot N(i,j)) \quad \text{(Mathematical equation 17)}$$

In the following, tm and tn are explained supplementally. First, tm is a value indicating the intensity of shade based on the orientation U' of the real illumination. Specifically, tm is calculated in accordance with mathematical equation 17 based on the reverse vector V of U and the normal vector N. In the present embodiment, as described above, based on tm, the additional shade component T+ is calculated.

Next, tn is a value indicating the intensity of shade based on the orientation U' of the real illumination. Specifically, tn is calculated in accordance with mathematical equation 17 based on the reverse vector V' of U' and the normal vector N. In the present embodiment, as described above, based on tn, the subtractive shade component T− is calculated.

Then, as described above, the gloss and the shade due to the real illumination are removed as the subtractive gloss component S− and the subtractive shade component T− and the gloss and the shade due to the virtual illumination are added as the additional gloss component S+ and the additional shade component T+.

Figure 21A:
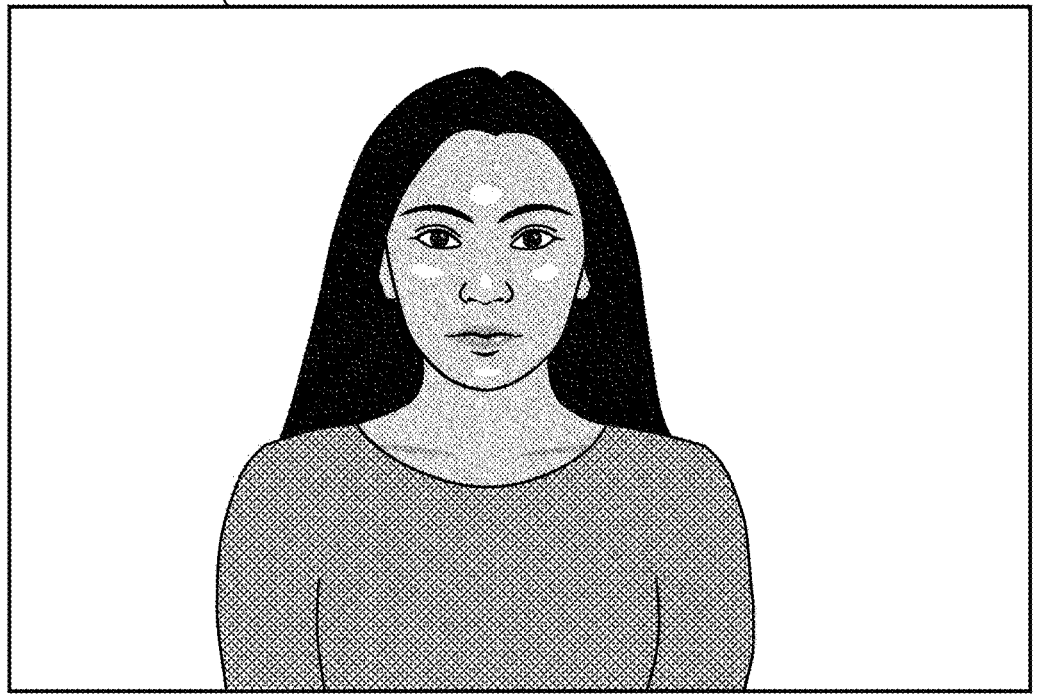
FIG. 21A is a diagram before the shade and gloss of an object are corrected in color image data.
Figure 21B:
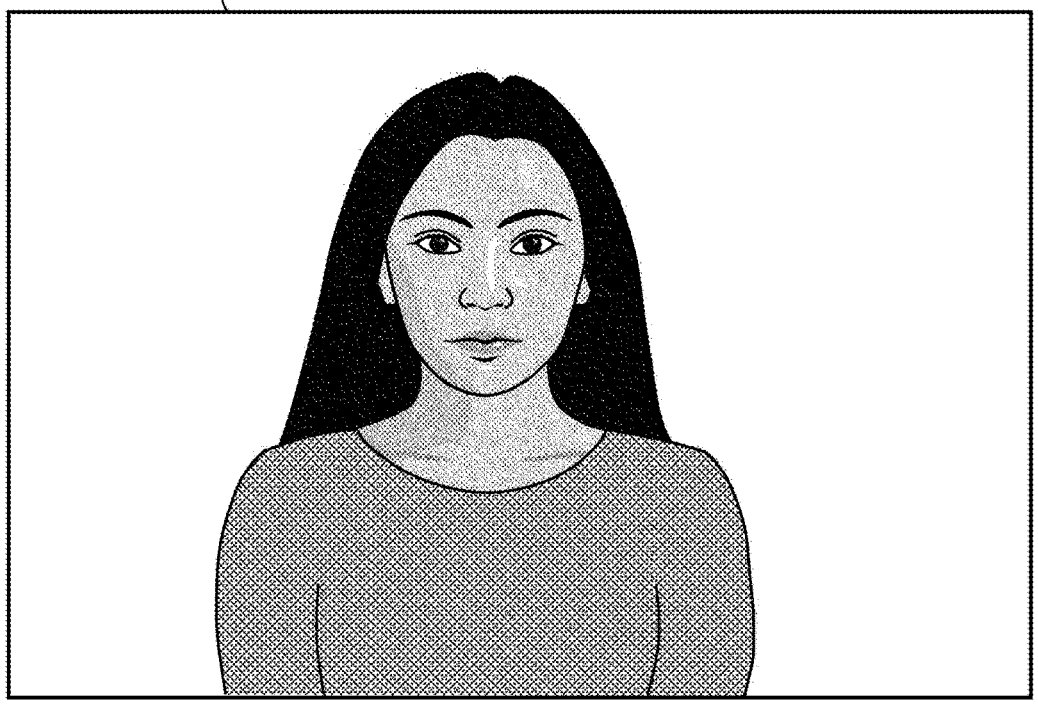
FIG. 21B is a diagram after the shade and gloss of an object are corrected in color image data.

By applying the above processing to the color image data, as shown in FIG. 21A and FIG. 21B, it is possible to correct the shade and the gloss of the object in color image data 2101 as in corrected image data 2101

In the present embodiment, by the lighting processing unit 307, the processing to correct the high-luminance area is performed, but as in the case with the first to third embodiments described above, it may also be possible to correct the high-luminance area by the high-luminance area correction processing unit 305. In this case, it is sufficient to replace I''' calculated by mathematical equation 14 with I' calculated by mathematical equation 5.

As above, by the image processing apparatus according to the present embodiment, by correcting the gloss and the shade of an object, it is possible to generate an image with a three-dimensional effect.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to generate a natural image with a three-dimensional effect after correcting the high-luminance area of the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   one or more processors and one or more memories, configured to function as a plurality of units comprising:
   (1) a first acquisition unit configured to acquire normal information corresponding to an image;
   (2) an estimation unit configured to estimate a parameter of a real illumination at the timing of capturing the image based on a high-luminance area of an object included in the image;
   (3) a first setting unit configured to set a parameter of a virtual illumination based on the parameter of the real illumination; and
   (4) a lighting processing unit configured to perform lighting processing for the image based on the normal information and the parameter of the virtual illumination,
   wherein the estimation unit estimates the parameter of the real illumination based on the normal information on a pixel included in the high-luminance area.

2. The image processing apparatus according to claim 1, wherein the first setting unit sets the parameter of the virtual illumination based on an orientation of a real illumination indicated by the parameter of the real illumination.

3. The image processing apparatus according to claim 2, wherein the first setting unit sets an orientation of a virtual illumination so that an angle formed by the orientation of the virtual illumination indicated by the parameter of the virtual illumination and the orientation of the real illumination does not become larger than or equal to a predetermined angle.

4. The image processing apparatus according to claim 1, wherein the plurality of units further comprises a second setting unit configured to set reliability for the normal information, and
   wherein the estimation unit estimates the parameter of the real illumination based on the normal information weighted by the reliability.

5. The image processing apparatus according to claim 1, wherein the estimation unit estimates the parameter of the real illumination based on a position of an illumination device in an image capturing apparatus having captured the image.

6. The image processing apparatus according to claim 1, wherein the plurality of units further comprises a second acquisition unit configured to acquire distance image data of the object, and
   wherein the first acquisition unit acquires the normal information by integrating object normal image data generated based on the distance image data and face normal image data generated based on face information and face normal information.

7. The image processing apparatus according to claim 1, wherein the plurality of units further comprises a third acquisition unit configured to acquire a target illumination parameter,
   wherein the first setting unit sets the parameter of the virtual illumination based on an orientation of a real illumination indicated by the parameter of the real illumination and an orientation of a target illumination indicated by the target illumination parameter, and
   wherein the target illumination parameter is set so as to give a desired highlight to the object.

8. The image processing apparatus according to claim 1, wherein the plurality of units further comprises:
   a third acquisition unit configured to acquire a target illumination parameter; and
   a third setting unit configured to set a highlight candidate area in which a highlight is given to the object preferentially,
   wherein the first setting unit sets the parameter of the virtual illumination based on an orientation of a real illumination indicated by the parameter of the real illumination and an orientation of a target illumination indicated by the target illumination parameter, and
   wherein the third acquisition unit acquires the target illumination parameter based on the highlight candidate area and the normal information.

9. The image processing apparatus according to claim 1, wherein the lighting processing unit performs the lighting processing by subtracting a gloss due to a real illumination in a case of image capturing of the image.

10. The image processing apparatus according to claim 1, wherein the lighting processing unit performs the lighting processing by suppressing a shade due to a real illumination in a case of image capturing of the image and giving a shade due to a virtual illumination.

11. The image processing apparatus according to claim 1, wherein the plurality of units further comprises a luminance correction unit configured to correct a high-luminance area of an object in the image, and
   wherein the lighting processing unit performs lighting processing for an image corrected by the luminance correction unit based on the normal information and the parameter of the virtual illumination.

12. The image processing apparatus according to claim 11, wherein the luminance correction unit extracts a color whose occupancy is high in the area of the object and corrects a luminance value of a pixel included in the high-luminance area based on the extracted color.

13. The image processing apparatus according to claim 12, wherein the luminance correction unit sets a weight that is heavier for a pixel whose luminance value is higher, which is included in the high-luminance area, and corrects a luminance value of a pixel included in the high-luminance area based on the extracted color and the weight.

14. An image processing method comprising:
    an acquisition step of acquiring normal information corresponding to an image by an acquisition unit;
    an estimation step of estimating, by an estimation unit, a parameter of a real illumination at the timing of capturing the image based on a high-luminance area of an object included in the image;
    a setting step of setting, by a setting unit, a parameter of a virtual illumination based on the parameter of the real illumination; and
    a lighting processing step of performing, by a lighting processing unit, lighting processing for the image based on the normal information and the parameter of the virtual illumination,
    wherein the estimating estimates the parameter of the real illumination based on the normal information on a pixel included in the high-luminance area.

15. A non-transitory computer-readable storage medium storing a program for causing a computer to function as an image processing apparatus comprising:
    a first acquisition unit configured to acquire normal information corresponding to an image;
    an estimation unit configured to estimate a parameter of a real illumination at the timing of capturing the image based on a high-luminance area of an object included in the image;
    a first setting unit configured to set a virtual illumination parameter of a virtual illumination based on the parameter of the real illumination; and
    a lighting processing unit configured to perform lighting processing for the image based on the normal information and the parameter of the virtual illumination,
    wherein the estimation unit estimates the parameter of the real illumination based on the normal information on a pixel included in the high-luminance area,
    wherein the computer comprises at least one processor and at least one memory, and
    wherein the first acquisition unit, the estimation unit, the first setting unit, and the lighting processing unit are implemented using the at least one processor and the at least one memory.

* * * * *